(12) United States Patent
Yousefi'zadeh

(10) Patent No.: US 7,370,064 B2
(45) Date of Patent: *May 6, 2008

(54) DATABASE REMOTE REPLICATION FOR BACK-END TIER OF MULTI-TIER COMPUTER SYSTEMS

(76) Inventor: Homayoun Yousefi'zadeh, 14 Posada, Irvine, CA (US) 92614

( * ) Notice: Subject to any disclaimer, the term of this patent is extended or adjusted under 35 U.S.C. 154(b) by 85 days.

This patent is subject to a terminal disclaimer.

(21) Appl. No.: 10/213,158

(22) Filed: Aug. 6, 2002

(65) Prior Publication Data

US 2004/0030739 A1  Feb. 12, 2004

(51) Int. Cl.
*G06F 12/00* (2006.01)
*G06F 7/00* (2006.01)
*G06F 15/16* (2006.01)

(52) U.S. Cl. .................. 707/200; 707/10; 709/203
(58) Field of Classification Search .............. 707/10, 707/102, 7; 709/217
See application file for complete search history.

(56) References Cited

U.S. PATENT DOCUMENTS

| | | | |
|---|---|---|---|
| 6,199,110 B1 * | 3/2001 | Rizvi et al. ............... | 709/227 |
| 6,266,666 B1 * | 7/2001 | Ireland et al. ............ | 707/10 |
| 6,266,669 B1 * | 7/2001 | Brodersen et al. ....... | 707/10 |
| 6,505,200 B1 * | 1/2003 | Ims et al. ................. | 707/8 |
| 6,735,593 B1 * | 5/2004 | Williams .................. | 707/102 |
| 6,754,699 B2 * | 6/2004 | Swildens et al. ......... | 709/217 |
| 6,772,159 B1 * | 8/2004 | Blount et al. ............ | 707/10 |
| 2003/0208511 A1 * | 11/2003 | Earl et al. ................ | 707/204 |

* cited by examiner

*Primary Examiner*—Apu Mofiz
*Assistant Examiner*—Susan Chen

(57) ABSTRACT

A replication method and system for a computer system having multiple database servers for at least one database, wherein database servers are provided with a unified view of the data content. The method includes the steps of establishing connections to said multiple database servers for communicating with said database servers; distinguishing between read and update query requests; and assigning queries to respective ones of said multiple database servers to preserve the consistency of the respective unified view of data of said multiple database servers in case of receiving update queries. Assigning each new query includes the steps of distinguishing between read and update queries, determining possible assignments of that new query to one or more of said multiple database servers, each said possible update query assignment to one of said multiple database servers being based on a transaction-based replication scheme to preserve the unified view data of said multiple database servers; and assigning that new query to one of said multiple database servers as a function of said possible assignments of that new query, to preserve respective unified view of data of said multiple database servers.

20 Claims, 14 Drawing Sheets

DATABASE REMOTE REPLICATION FOR BACK-END TIER OF MULTI-TIER COMPUTER SYSTEMS

FIELD OF THE INVENTION

The present invention relates generally to database systems, and in particular to replication of database systems.

BACKGROUND OF THE INVENTION

Database systems are utilized in many aspects of data processing systems, including in networked computer systems such as the middleware, Internet and the World Wide Web (WWW) that have grown to a robust infrastructure for handling mission-critical business traffic. As the result, Internet utilization is still growing exponentially with the increasing number of commercial and support web sites (servers) and Internet users using client workstations (client). To support this growth, web sites (implemented on web servers and database servers) must be able to set up and maintain a few million connections every second. Further, quick response time and continuous availability are mandatory requirements as web sites compete to offer users the best online experience.

Conventional networked computer infrastructure for businesses (e.g., over the Internet and WWW), utilizes multi-tier client-server architecture. Client-server architecture provides multiple clients with access to the same data via servers. In its most basic form, a two-tier model is a client-server model in which a client communicates with a server across a network to request remote services. For example, a retail user can point a browser on a personal computer to web site of an online bookstore to request information about a book title. The request in turn is routed to a centralized web server through the network, and the web server in turn communicates with a database engine/server to return the requested information to the retail user. The centralized server can communicate with a number of clients simultaneously.

In the two-tier architecture, one server is responsible for offering both web and database contents. A two-tier architecture provides multiple clients with a uniform presentation layer that communicates with a centralized data storage layer. The presentation layer is generally the client and the data storage layer is the server. A disadvantage of the two-tier architecture is that it is not capable of adapting to changing environments and scaling with growing user and data volume and traffic. This is because each client carries the presentation logic and a part of business logic while the server carries the other part of business logic as well as the required resources such as the web and database servers.

The scalability and changing environment issues in a two-tier architecture have been addressed to a certain degree by extending the two tiers to three. A three-tier architecture isolates the data processing in a central location that can be easily changed without impacting the clients. In a three-tier architecture, the presentation logic resides in the first (client) tier, the business logic in the middle tier, and other resources such as database reside in the back-end third tier. The middle tier of a three-tier architecture (usually the application server) handles data processing and plays the role of the interface between the front-end tier (client) and the back-end tier (database).

The middle tier is the primary interface that directly interacts with the clients located in the first tier and hides all of the functional details of the back-end tier from the clients.

In an example three-tier architecture, the middle tier comprises a web server that interacts with the client web browsers, and the back-end tier comprises a database engine that interacts only with the web server. However, a major disadvantage of such a system is that a relatively large number of clients in the first tier simultaneously requesting remote services can gradually create a bottleneck in the second and third tiers. This degrades system performance and eventually availability.

To alleviate this problem, some there-tier architectures have created a multi-tier architecture that expands the middle tier layer into multi-layer architecture, wherein a single web server is replaced with multiple web servers to increase performance of the middle tier while keeping the functionality transparent from the first layer clients. Though the performance shortcomings of the middle layer tier are somewhat alleviated, the back-end database tier continues to suffer substantially from lack of availability, lack of scalability and performance enhancements, thereby negatively impacting the availability and scalability of the entire multi-tier system.

There is, therefore, a need for an implementation-independent method that provides better scalability and performance for the back-end database tier. In one example, implementation-independent database load balancing techniques may be employed. The major requirement for employing such techniques is to provide multiple databases with a unified view of data among those databases independent of the specific implementation of the database. There is also a need for scalable computer system comprising networked client and server computers that maximizes server efficiency, such as in database management servers. There is also a need for a method and system that can scale server capacity dynamically to match aggregate client demand while ensuring continuous service availability network computing systems.

BRIEF SUMMARY OF THE INVENTION

The present invention provides the means of creating a unified view of data among multiple databases as a part of the effort for alleviating the shortcomings of conventional systems. In one embodiment, the present invention provides implementation independent database replication scheme for a scalable computer system comprising networked client and server computers, to maximize server efficiency. Database replication system is then employed as the requirement for addressing availability, scalability, and performance issues through the use of dynamic remote replication scheme of database management systems.

In one aspect, the present invention provides a replication method and system for a computer system having multiple database servers for at least one database. The method includes the steps of establishing connections to said multiple database servers for communicating with said database servers, providing the database servers with a unified view of the data in the database through the use of a policing centralized remote replication server taking advantage of a transaction-based query assignment method. Assigning each new query includes the steps of distinguishing between read and update queries, determining possible assignments of that new query to one or more of said multiple database servers, each said possible assignment to one of said multiple database servers being based on a metric such as a load balancing scheme along with a remote replication scheme to preserve the respective view of data of said multiple database servers; and assigning that new query to one of said multiple database servers as a function of said possible assignments of that new query, to preserve respective view of data of said multiple database servers. In this aspect, the unified view of data is preserved among multiple databases using a centralized remote replication server intercepting query requests and distinguishing between read and update queries. When the arrived query includes an update, the centralized server opens a transaction on all of database servers placing a software lock that prevents accessing the data requested by the query for as long as the lock is in place. The said centralized server then passes the query to all of the said database servers affirming that they are all updated. The said centralized server will remove the lock and close the transactions after receiving acknowledgements from all of the said database servers confirming successful execution of the update query. If the said centralized server does not receive the acknowledgement from all of the said database servers within a certain period of time, it rolls back the query for all of the database servers preserving the consistency of unified view of data among database nodes and avoiding the possibility of facing a deadlock in which the system comes to a grinding halt state as the result of each of the said database servers waiting for an event that only another database server can cause.

In addition, the centralized server and the existing database servers cooperate as a replication group that can dynamically add and remove member database servers without interrupting the overall operation of the group. In case of adding a new member to the group, the replication group members offer necessary synchronization methods to assure that a newly added or recovered database server is provided with the same consistent unified view of data prior to coming online as the new member of the replication group.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1A:
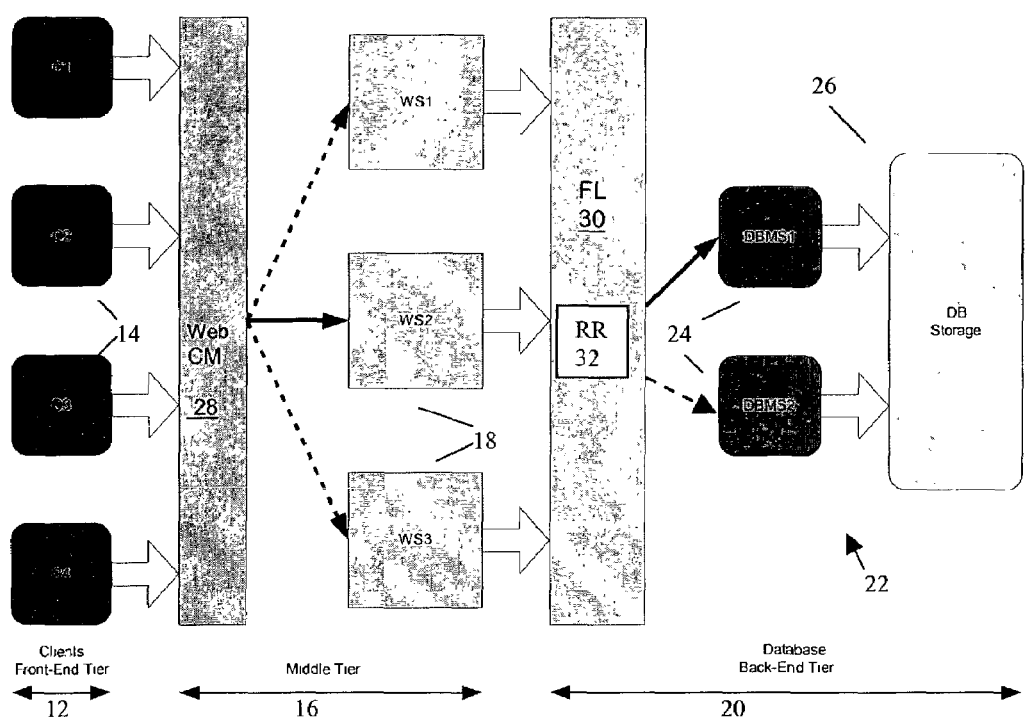
FIG. 1A shows an example block diagram of an embodiment of the architecture of a multi-tier computer system according to the present invention.

FIG. 1A shows an example architectural block diagram of an embodiment of a multi-tier network computer system 10 according to the present invention. The computer system comprises a three-tier architecture system including a front-end tier (first tier) 12 having multiple client workstations (clients) 14 (e.g., C1, C2, C3, C4), a middle-tier (second tier) 16 including servers 18 for data processing, and back-end tier (third tier) 20 including resources such a database system 22. The middle tier 16 (e.g., application server) provides data processing and interface between the front-end tier 12 (client) and the back-end tier 20. The middle tier 16 comprises the primary interface interacting with the clients 14 located in the first tier 12, and hiding all of the functional details of the back-end tier 20 from the clients 14.

In the example three-tier architecture 10, each server 18 in the middle tier 16 comprises a middleware web server (e.g., WS1, WS2, WS3) that interacts with client web browsers running on clients 14. The database system 22 in the back-end tier 20 comprises multiple database management servers (e.g., DBMS1, DBMS2) 24 and on or more databases 26 (e.g., data repositories), wherein the database system 22 interacts with the web servers 18. The middle tier 16 can further include a control module (CM) 28 for the web servers 18, wherein the clients 14 using browsers communicate with the control module 28 which forwards each client's request to an appropriate web server 18. The control module 28 is functionality transparent to the clients 14, and as far as the clients 14 are concerned the control module 28 is a web server itself. Each of the web servers 18, communicates with the database system 22 to e.g. send a query from a client 14 to the database system 22, receive a result back from the database system 22, and forward the results back to the client 14. By example, a database server/engine (DBMS) 14 can comprise software running on a computer to enable a user to create, maintain, and manage electronic databases. A database server acts as a broker between the physical database 26 storing data and the users (e.g., clients 14) of the database 26.

Figure 1B:
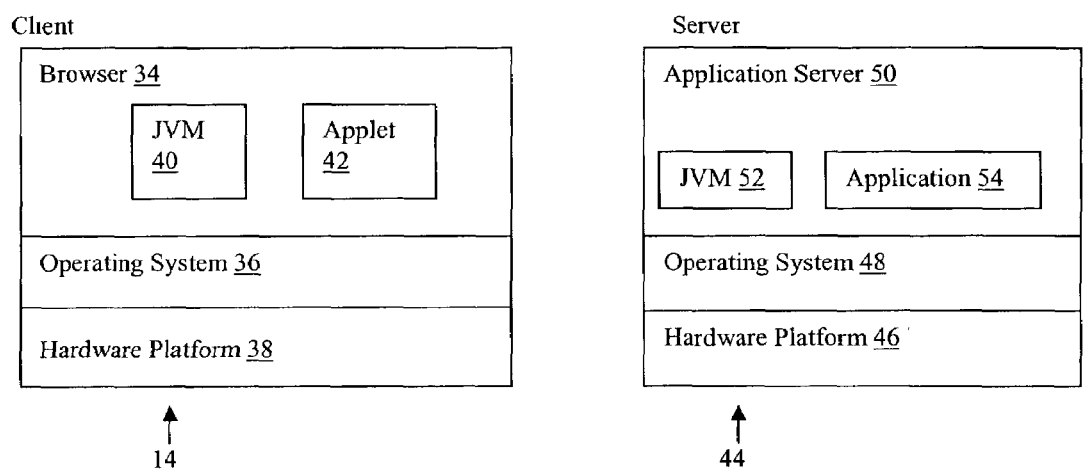
FIG. 1B shows example functional block diagrams of embodiments of a first tier client, and second and third tier servers in FIG. 1A.

As shown in FIG. 1B, in one embodiment, a front-end tier client 14 comprises a browser 34 (e.g., Netscape™ browser) running on an operating system 36 (e.g., Windows 98™ operating system) on a hardware platform 38 (e.g., Intel™ hardware platform computer system including CPU, memory, storage device, ROM, and communication interface). The browser 34 includes a Java Virtual Machine (JVM) 40 for running Java Applets 42. Each server 18 in the middle tier 16, and each database server 24 in the back-end tier 20, in FIG. 1A can comprise a complete server platform 44 shown in FIG. 1B, wherein the server platform 44 includes server hardware 46 such as an Intel based computer system, operating system 48 such as Linux™, Solaris™, etc. for running application server software 50 such as Apache web server or PostgreSQL database server. The application server 50 may include JVM 52 and the application 54 may take advantage of Java technology.

Referring back to FIG. 1A, the Remote Replication (RR) module 32 preserves the consistency of the unified view of data among database servers 24 by opening a transaction on all of database servers 24 for all of the update queries and placing a software lock that prevents accessing the data requested by the query for as long as the lock is in place. In one example, the database servers 24 are forced to create and preserve a unified view of data on shared or mirrored database(s) 26. The computer system 10 further comprises a transparent back-end functional layer (FL) module 30 providing interface between the web-servers 18 and the multiple database servers 24. The FL module 30 is independent of the database server and database implementation. As such, the FL module 32 can be utilized in conjunction with different database servers 24.

The FL module 30 dynamically distributes client requests via the web servers 18 across the multiple database servers 24 using connections to the database servers 24, while appearing as a single database server to the web servers 18. The FL module 30, hence, hides the implementation of database system 22 from the web servers 18. In one embodiment, the FL module 30 includes a centralized RR module 32 for preserving the unified view of data among database servers 24. Additionally, the RR module 32 may take advantage of database specific load-balancing techniques for assigning queries to respective multiple database servers 24, to, and to balance respective loads of the multiple database servers 24. The RR module 32 allows incoming query traffic to be distributed efficiently, providing greater economies of scale and fault tolerance. The database back-end tier 20 appears as one database server to the web servers 18.

In one embodiment, the RR module 32 monitors the state of the respective multiple database servers 24 and selectively routes queries to the database servers 24 to optimize performance and availability. In addition to preserving the unified view of data, the RR module 32 ensures that queries are routed to e.g. most available database servers (nodes) 24, providing predictable quality of service. The RR module 32 provides high performance and high scalability, and thereby eliminates the database back-end bottleneck for multi-tier computer systems such as the ones utilized in business environments using Internet and WWW. Further, as described below, in one version the RR module 32 can include dual active-active or active-passive remote replication models, thereby eliminating single point of failure on the RR module.

To perform database remote replication, in one embodiment, the RR module 32 comprises one or more schemes/methods/processes for assigning incoming queries to said multiple database servers 24.

The RR module 32 selects a database server 24 to assign a client 14 query request from a web server 18 thereto, and passes the request from the web server 18 to the selected database server 24. The RR module 32 then receives the result from the selected database server 24, and sends the result back to the web server 18 to pass on to the client 14. Alternatively, the assigned database server 24 may directly send the result back to the web server 18 to pass on to the client 14. As such and in either case, the database remote replication module 32 is transparent to the web servers 18 and the clients 14.

In a conventional multi-tier environment, a request for information residing in a database is generated from a front-end tier client. The client then sends a request to the middle tier server also known as middleware,server. In one example, some requests ask for static content of an HTML page and are handled directly by the web server. Other requests ask for dynamic content (e.g., video/audio streaming) and are handled by programs (e.g., MP3) running remotely or locally in relation to the web server. A request can be in the form of an HTTP request asking for information stored in a database (e.g., about a music album title). The web server translates the request into an SQL query, and sends the request to, and receives response from, the database server (e.g., dynamic content in media streaming applications).

In one version, the web server located in the middle tier receives the request and handles the processing through the use of Common Gateway Interface (CGI) to create dynamic content. With CGI, the web server passes the request to the external data source, namely database server, in the back-end tier, and the web server receives the result from the database server and passes it to the client. There is a limit on the number of concurrent requests a database server can handle because the database server must create a new process every time the database server receives a new request. A CGI program also cannot interact with the web server and take advantage of its capabilities directly once it begins execution because it is running in a separate process.

In another version, and to alleviate the above problems, the web server located in the middle tier receives the request and handles the processing through the use of Java servlets to create dynamic content. Servlets include modules that extend request/response-oriented servers, such as Java-enabled web servers. For example, a servlet can take data in an HTML order-entry form and apply business logic used to update an order database. Servlets can be embedded in many different servers because the servlet API (used to write servlets) assumes nothing about the server's environment or protocol. Servlets effectively replace Common Gateway Interface (CGI) scripts. Servlets also resolve server-side programming with platform-specific APIs (they are developed with the Java Servlet API, a standard Java extension).

Although servlets are most widely used within HTTP servers and can be used to handle HTTP client requests, servlets can be deployed in conjunction with any existing application server including database servers. For example, servlets process data posted over HTTP requests using an HTML form, including business data. Servlets can also be used to solely create the infrastructure of an application server rather than as an extension to the existing server. A servlet can handle multiple requests concurrently, and can synchronize requests. Servlets can forward requests to other servers and servlets. In addition, servlets can partition a single logical service over several servers, according to task type or organizational boundaries, independent of the specific implementation of the technology.

According to the present invention, in one embodiment the RR module 32 comprises a process to service multiple requests by e.g. multi-threading. Multi-threading is an extension of time sharing in computer systems that provide impression of performing several processes simultaneously by running each process for a short period of time, then saving its state and switching to the next process and so on. Threads extend the concept from switching among several processes (different programs) to switching between several different functions executing simultaneously within a single process. Multi-threading provides more efficient utilization of computer resources such as controlling and responding to GUIs, performing file I/O, perform computation, all in the same process (program). Server part of a client/server model can be efficiently implemented in the form of a multi-threaded program (process). For example, instead of starting a new program (process) with each new client 14 request, the RR module 32 spawns a new thread within the same program to handle the request and hence achieves better resource management.

Further the RR module 32 utilizes at least one interface for connecting to, and communication with, the database servers 24. In one version, the RR module 32 is implemented to transparently communicate with the middle-tier web servers 18 and the back-end tier database servers 24. The RR module 32 is implemented as object-oriented software that can be easily plugged into web browsers 18 and be used for building web-based applications and Graphical User Interfaces (GUIs) along with built in database access methods, security, and networking support. The RR module software can execute on several different computer systems by layering libraries on top of any operating system, and provides a robust method of integrating incompatible computer systems within the framework of e.g. reusable component software, thin client-server software, network programming, secure browser-based software, threaded multimedia code, etc. For the server side, the RR module software uses Java technology to make a productive application environment, and provides a standard generic and portable mechanism for efficiently developing modular server side applications such as generating dynamic web content.

Java™ technology by Sun Microsystems™ and its application programming interfaces (APIs) provide an example implementation platform for the RR software, to transparently communicate with the middle-tier web servers 18 and the back-end tier database servers 24. The RR module 32 utilizes Java-based technology to implement a process to service multiple requests using multi-threading in Java. Any technology component that can interact directly or indirectly with back-end database servers 24 is capable of utilizing the RR module 32 of the present invention. A database remote replication module 32 according to the present invention provides an independent layer between the middle and back-end tiers 16 and 20, respectively. In addition, the use of Java Technology provides the means of using the same approach independent of the implementation of database engine with the only requirement of supporting transactions by the database engine.

Referring back to FIG. 1A, each web server 18 translates an HTTP request sent from a client 14 web browser 34 in the front-end tier 12, to an SQL query request. The RR module 32 establishes connections with the database servers 24 for query communication between the web-servers 18 and database servers 24 such that the RR module 32 functions independent of the choice of database servers. An arrived read query does not have an impact on the content of the database servers 24 and hence has no impact on the consistency of the unified view of data. An arrived update query on the other hand changes the content of the database servers 24 and hence has to reflect on the data content of database servers 24 in order to preserve the consistency of the unified view of data among the database servers 24. In one example, said connections between the RR module 32 and the database servers 24 are established using a database server connection.

The RR module 32, hence, appears as the database servers to the middle tier servers 18 that accepts any typical database connection. In one example, the middle tier servers 18 try to establish database connections with RR module 32 relying on an interface such as e.g. the database connectivity API of Java technology Java DataBase Connectivity™ (JDBC) from Sun Microsystems). JDBC comprises a portable database connectivity tool that provides universal interface into SQL databases. The connection interface can be deployed to build applications that can be equally run on any different database. Any other database connectivity means that provides an interface into the database servers 24 can be equally utilized. In another example, Open DataBase Connectivity™ (ODBC) can be used as the means of database connection. ODBC was designed and developed to create a single standard for database access in Windows environments. The industry has now accepted ODBC as the primary means of connecting to databases in Windows environments. Independent of the means of database connection, the RR module assigns the arrived query to one of the back-end database servers 24 to process the SQL query and return the result to the initiator of the request. If the SQL query is an update query, the RR module 32 opens a transaction with each of the database servers 24, places a lock on the portion of data that needs to be updated, updates each of the database servers 24, and finally removes the lock after successfully updating every one of database servers 24. In case of any failure in the update operation, the content of every one of database servers 24 is rolled-back to the previous consistent state prior to removing the lock. The result of SQL query can be either returned to the initiator directly or indirectly. In case of indirect return, the specific database 24 redirects and returns the result to the initiator such as one of the web servers 18 rather than sending the result to the RR module 32. The operation, however, is transparent to the initiator meaning that the initiator still sees that the result came from the RR module 32. The indirect method of returning the SQL query result can only be utilized if the specific implementation choice of database supports this kind of operation. In an alternative scenario and if the specific implementation choice of database does not support redirection, the direct method is deployed in which the specific database 24 sends the result of SQL query to RR module 32 and the RR module 32 in turn forwards the SQL query result back to the initiator. The RR module 32 can interact with a variety of different database servers 24. For example, a commercial database management system (DBMS) such as Oracle, IBM DB-2, MS-SQL or a freeware DBMS such as PostgreSQL originally implemented in UC Berkeley by Michael Stonebaker team from its ancestor Ingres, or MySQL originally implemented by TcX can be utilized.

The communication protocol between the RR module 32 and the web servers 18 can comprise, for example, Unified Resource Locator (URL), Remote Method Invocation (RMI), Remote Procedure Call (RPC), Common Object Request Broker Architecture (CORBA), or other remote communication methods.

As described below by way of examples in conjunction with FIGS. 2A-B, the communication model between the RR module 32 and the database servers 24 utilize connection interfaces such as e.g., JDBC API and an optimized query processing method such as a connection with multiple instances and direct connections to the database servers 24.

The back-end tier system consisting of RR module 32 and the existing database servers 24 preserve the unified view of data at all times. The RR module 32 checks the health status of each of the database servers 24 on a frequent basis. The RR module 32 performs the check by sending frequent ping commands to each of database servers 24 and receiving the reply from the individual database servers. The RR module repeats the ping twice if it does not receive the reply in a certain period of time. It then assumes that the corresponding database server 24 is offline and hence will not stay synchronized with other database servers 24. At this stage the RR module 32 reports the problem. A new database server that is added to the group of database servers 24 at some point in time has to be provided with the up-to-date unified view of data as the other database servers 24 prior to coming online and serving as a member of database servers 24 group. The back-end tier system consisting of the RR module 32 and database servers 24 use checkpoints as the means of providing the same unified view of data for a newly added database server to the group of database servers 24. A checkpoint is a point in time static image of a database system that includes complete information about the status of database data content. A checkpoint can be created manually or on a pre-defined schedule. The RR module 32 schedules frequent checkpoints to be created from the data content of database servers 24. When a new database server is added or a repaired database server is returned to the group of database servers 24, the RR module 32 is notified by the system administrator. The RR module 32 then adds the new/returned database to the group of database servers 24. At this point in time, the RR module checks for the existence of any checkpoint in the added or returned database server. If such a checkpoint is found, the incremental difference between such a checkpoint and the most recent checkpoint in the group of database servers 24 provides a view of data for the new/returned database server that is consistent with the view of data of the existing database servers 24 at the time the last checkpoint was taken. If there is no such a checkpoint, the complete data content according to the last checkpoint is provided to the new/returned database server. The RR module 32 then requests a new checkpoint to be created, places transaction-based locks on the data content of database servers 24, and synchronizes the new/returned database view of data according to the current state. The RR module 32 then removes the locks. At this time, the newly added or returned database server has the same unified view of data as the other database servers 24.

Figure 2A:
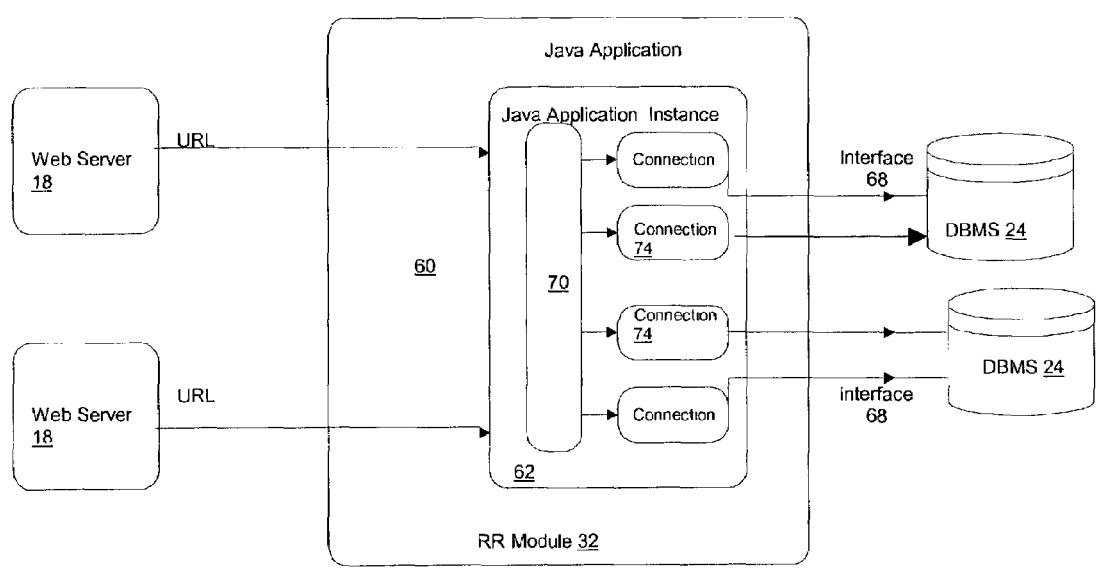
FIG. 2A shows an example block diagram of an embodiment of the functional architecture of remote replication module of FIG. 1A.
Figure 2B:
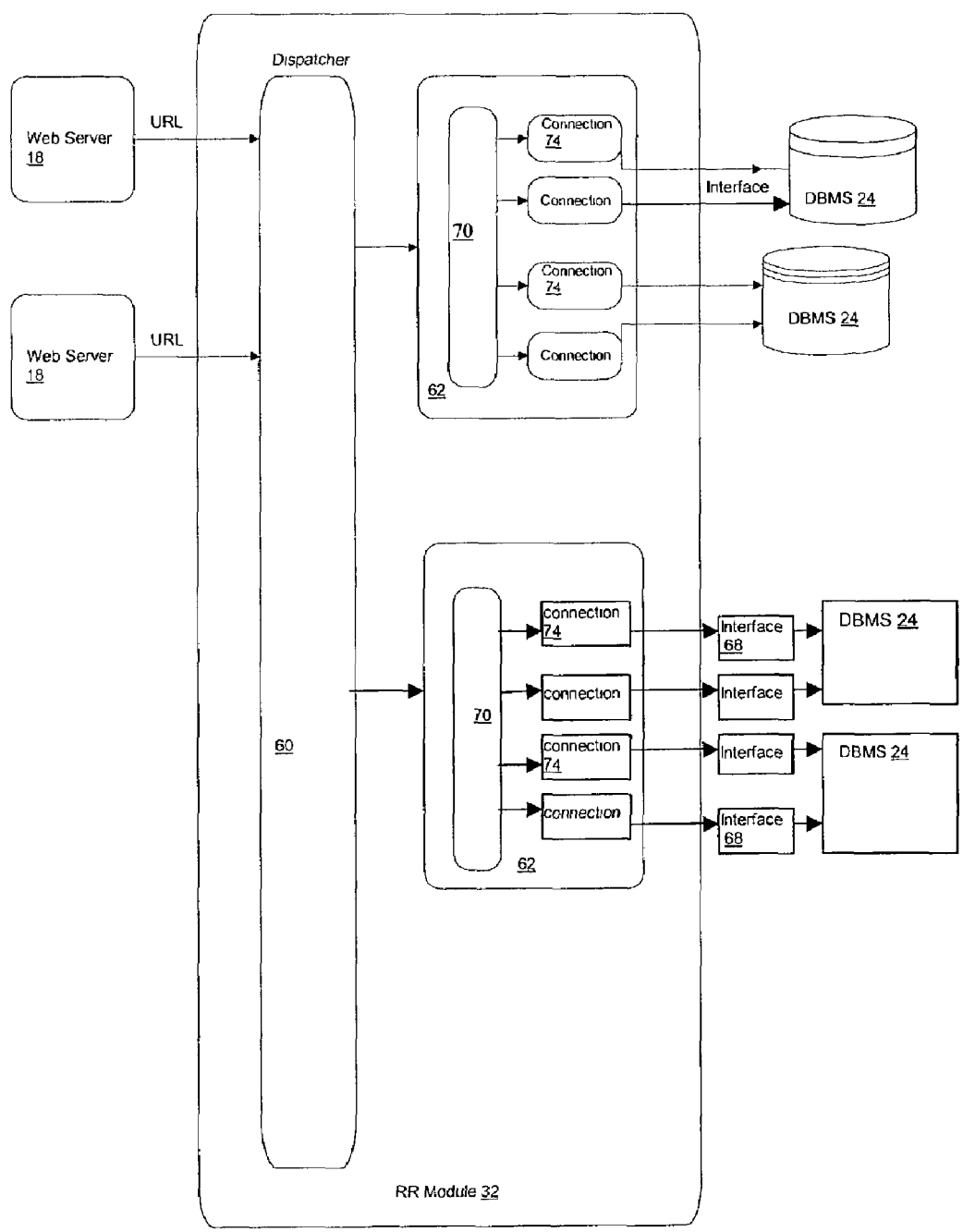
FIG. 2B shows another example block diagram of an embodiment of the functional architecture of remote replication module of FIG. 1A.

Referring to FIG. 2A, in one version, the database remote replication module 32 utilizes Java technology for providing database replication and connectivity. In one embodiment, the query request from a client 14 is sent to a web server 18 which forwards the translated SQL request to the RR module 32 in sequence. The RR module 32 selects a database, and routes the request to the selected database server. Upon receiving a result from the selected database server 24, the RR module 32 sends the result back to the web server 18 which in turn forwards the result to the client 14. Alternately, the selected database server 24 can send the result back to the web server 18 after notifying the RR module 32. Remind that in case of receiving an update query, the RR module 32 enforces a set of transaction-based locks on all database servers 24 ensuring that the consistency of the unified view of data is preserved.

The RR module 32 includes a remote communication model (e.g., URL) with the web servers 18. The RR module 32 receives a request from a web server 18 via the use of URL or some other communication scheme. The RR module 32 assigns an arriving query request to a database server 24 transparent to the web server 18.

In one version, the RR module 32 includes a pool of connections to the database servers 24 using a connection interface 68. The RR module establishes a connection (or uses an existing connection) to the selected database server 24, sends the request to the selected database server 24 for processing, receives the request result back from the selected database server 24, and sends the result back to the requesting web server 18. The RR module can alternatively be notified by the selected database server 24 that the result was transparently sent back to the requesting web server 18. In one version, the interface connections from the web servers 18 to the RR module 32 comprise JDBC connections. As discussed, JDBC is a Java API and hence is considered a software connection. JDBC relies on low a level socket communication model to communicate with a database. The Java software package relies on Java Virtual Machine (JVM) as the compiler. Ports of JVM exist for different operating systems running on different hardware (e.g., Solaris operating system on Sparc Sun Microsystems hardware platform or Linux operating system on Pentium Intel hardware platform).

The architectural block diagram in FIG. 2A also provides a synchronization model implemented by the RR module 32 using Java technology in a multi-tier architecture. In this model, database systems achieve redundancy by relying on mirroring wherein different physical databases have the identical contents, and a synchronization mechanism is used and enforced to ensure the mirroring operation always provides a unified view of data for database systems.

The architecture in FIG. 2A utilizes web servers 18. Each web server 18 is a stand-alone server that may or may not rely on a server-side utility such as Java servlets or CGI scripts. The RR module 32 comprises an independent server utilizing Java technology. Each web server 18 remotely communicates with the RR module 32 in place of the database server. As specified, the communication can utilize any communication protocol such as RPC, CORBA, RMI or simple URL. In FIG. 2A, the employed communication tool is Universal Resource Locator (URL). The web servers 18 translate an HTTP request to an SQL query and send it to the RR module 32 via the remote communication protocol.

As shown in FIG. 2A, the RR module 32 includes a dispatcher instance 70 with a connection pool 72 having a number of direct connections 74 to the database servers 24. The dispatcher instance 70 includes a set of connections 74 to the database servers 24 and selects a connection from that set to the selected database server. Another example replaces URL with CORBA, and the JDBC connections with native DBMS connections In FIG. 2B, the database remote replication function according to the present invention applies to two or more database servers 24 with the same implementation. The RR module 32 operates with one or more sets of database servers 24 at the same time. For example, the RR module 32 can operate with a set of two PostgreSQL database servers and another set of two Oracle database servers simultaneously, wherein the database replication function in each set of database servers is separate from the other set of database servers. As such, the update query request is synchronized against the database servers belonging to the same set with same implementations and is independent from the other sets of database servers. The RR module 32 utilizes connections according to one or more interfaces 74 with each set of database servers, for communication with the database servers. The RR module 32 plays the role of database server itself to the web servers 18. The RR module 32 transparently accepts typical database connections requests, e.g., JDBC, ODBC, etc. from the middle tier servers 18, selects and connects to one of the database servers 24 using connections 74 in a manner transparent to the middle tier servers 18 in order to process the arrived query request.

The RR module 32 can be implemented on server hardware platform including Java technology support classes and running on any operating system. In one version, the remote replication module 32 comprises Java classes supported by e.g. J2SDK of Sun Microsystem™ running on operating systems such as e.g. Linux, FreeBSD Unix platform, Sun Solaris, IBM AIX, HP HP-UX, SGI IRIX, etc. The operating system in turn can be running on server hardware platforms based on technology from, e.g., Intel, Sun, etc.

The RR module 32 functions independent of the choice of database servers 24 and databases 26, providing the database servers 24 with a unified view of data in the databases 26. Further, for example a user friendly Java-based Graphical User Interface (GUI) using e.g. JavaServer Pages (JSP) API of Java of Sun Microsystems, Visual Basic or Visual C++ from Microsoft, or Tk/Tcl for Solaris, can be used to configure, setup, and manage the RR module.

Figure 3:
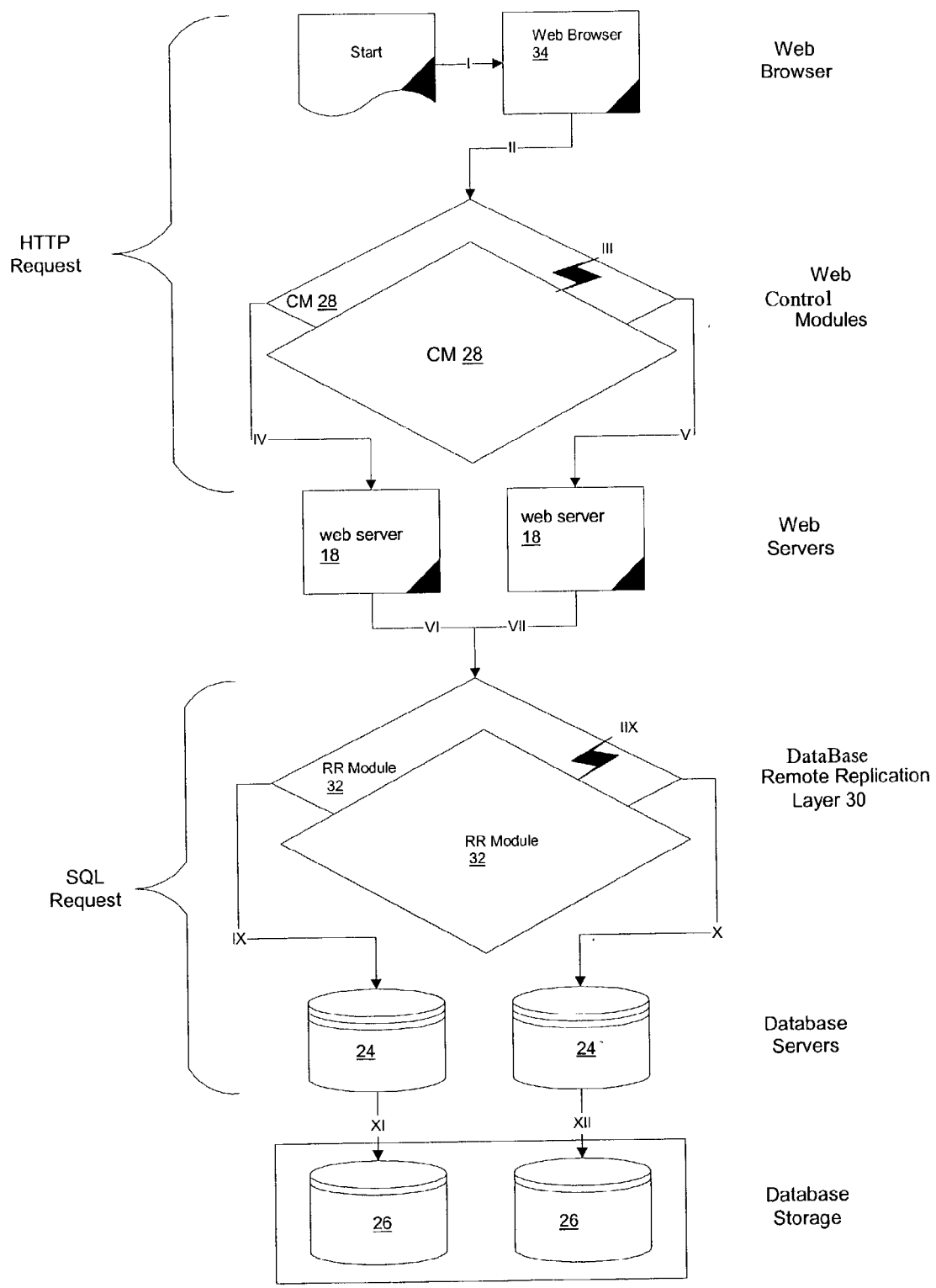
FIG. 3 show a flow diagram showing an example data flow through the multi-tier computer system of FIG. 1A.

Referring to FIG. 3, an example data flow diagram shows example logical flow of data (e.g., requests/queries) through a multi-tier client-server computer system, implementing the present invention. A user points the browser 34 from a remote client 14 across a wide, metropolitan, or local area to a web server 18 co-located with, or remotely located against, other components of the distributed model including database servers, database storage, and database remote replication units. In one example, a user at a client 14 uses a web browser 34 to establish a connection II with a web server 18, using a URL address and using HTTP protocol to request information stored in a database about an item. The middle tier 16 includes two control modules (CM) 28 with a heartbeat interface III therebetween. The control modules 28 provide a dual web routing model. The two control modules 28 provide redundancy in the form of an active-active or active-passive control module pair. For example in case of active-passive embodiment, when an active control module fails the passive control module becomes active for routing transactions to the web servers 18. The status of an active control module is monitored by the passive control module via the heartbeat interface III. The heartbeat interface III can comprise a simple dedicated 10baseT Ethernet interface sending frequent ping requests between the two control modules 28. The active control module 28 routes the HTTP request to a selected one of e.g. two web servers 18, using one of the data paths IV and V. The selected web server 18 parses the HTTP request and translates it to a standard SQL request. The web server 18 then send sends the request to the RR module 32.

In conventional multi-tier models the web servers 18 are directly connected to a database server and send their database inquiries to that single database server. A major disadvantage of such a method is that it can easily create a bottleneck from the database server under heavy load. In addition, the failure of the single database server introduces a single point of failure for the whole system. However, according to one embodiment of the present invention, a remote replication layer 30 replicates database content against multiple database servers 24 to prevent bottlenecks and single points of failure. The remote replication layer 30 hides the remaining underlying layers from the web servers 18 which view the database remote replication layer 30 as a database server.

In this version, the remote replication layer 30 includes two database RR modules 32 described above, wherein at any given time, one RR module 32 is active and the other RR module 32 is passive. As an alternative, a scenario in which both of the RR modules 32 are active can be considered. Data paths VI and VII show connections between individual web servers 18 and the active database RR module 32. The active RR module 32 preserves the consistency of the unified view of data among multiple database servers 24, and the passive RR module 32 becomes active as the result of failure of the active RR module 32. A heartbeat interface IIX between the two database RR modules is utilizes, wherein the status of the active database RR module 32 can be monitored using the heartbeat interface IIX. The heartbeat interface IIX can comprise e.g. a dedicated 10baseT Ethernet interface sending frequent ping requests between the two RR modules 32. In an active-active scenario, every thing remains the same with the exception of the fact that both of the RR modules serve the purpose of preserving the unified view of data while healthy. At the same time they serve the purpose of monitoring the other unit.

The active database RR module 32 accepts a SQL request from one of the web servers 18, selects a database server 24 among the multiple database servers and sends the SQL request to the selected database server 24. Data paths IX and X show the connections between the database RR modules and the database servers 28. The SQL request is sent to databases 26, wherein the physical databases can comprise storage modules in the form of e.g. centralized back-end storage repository shared among the database servers or mirrored dedicated segments for the individual database servers 24. In either case, the database servers 24 have a unified view of data. FIG. 3. shows a scenario in which databases 26 are mirrored dedicated segments. For a shared disk, the database servers 24 are connected to one database 28 with shared disk farm. Data paths XI and XII show the connections among the database servers 24 and the databases 26 (storage modules). Once the SQL request is processed by a database server 24 and the corresponding database storage 26 storing the requested item information, a result is sent back to the client 14 traversing the reverse path and translation.

In one version, the database RR module 32 performs availability analysis to determine assignment (routing) of incoming update request/query traffic to replicate of the content of database servers 24, and enhance availability of the multi-tier system 10. Factors that impact availability of a multi-tier system include:
1. Server failure, wherein the server becomes unavailable due to a hardware or operating system failure.
2. Software failure, wherein individual applications can hang or stop responding even though other applications are healthy.
3. Content failure, wherein the server and application are working properly but are responding to requests with a response that does not contain the right content.
4. Heavy traffic load, wherein servers have a well-defined response curve in relation to load and as traffic increases each server responds to requests promptly until the server reaches a point at which it stops responding to any request (i.e., the server is either on or it is off).
5. Network unavailable, wherein if the link between the server and the outside world becomes unavailable, the server becomes unreachable.

The above factors are addressed by e.g.: (1) proactive monitoring of the database servers; (2) proactive monitoring of software daemons running on the database servers; monitoring applications on the database servers to ensure that the content failure problem is resolved; (3) introducing a time out value to determine when a server becomes non-responsive due to heavy load, wherein if any of the database servers fail to provide a response within the specified time, another database server is utilized to respond to the content inquiry; and (4) if the database servers are geographically distributed, introducing a time out value can then determine database server unavailability, otherwise, all of the database servers located on the same segment of a network are impacted by network congestion the same way.

Accordingly, in one version the RR module 32 includes a transaction-based remote replication scheme, providing database server replication that can function with a number of different database servers, without depending on any particular database server or database implementation. The RR module 32 provides both high availability and replication for the back-end database tier of the multi-tier scalable systems. High availability guarantees that end users always receive the quality of service desired.

Figure 4:
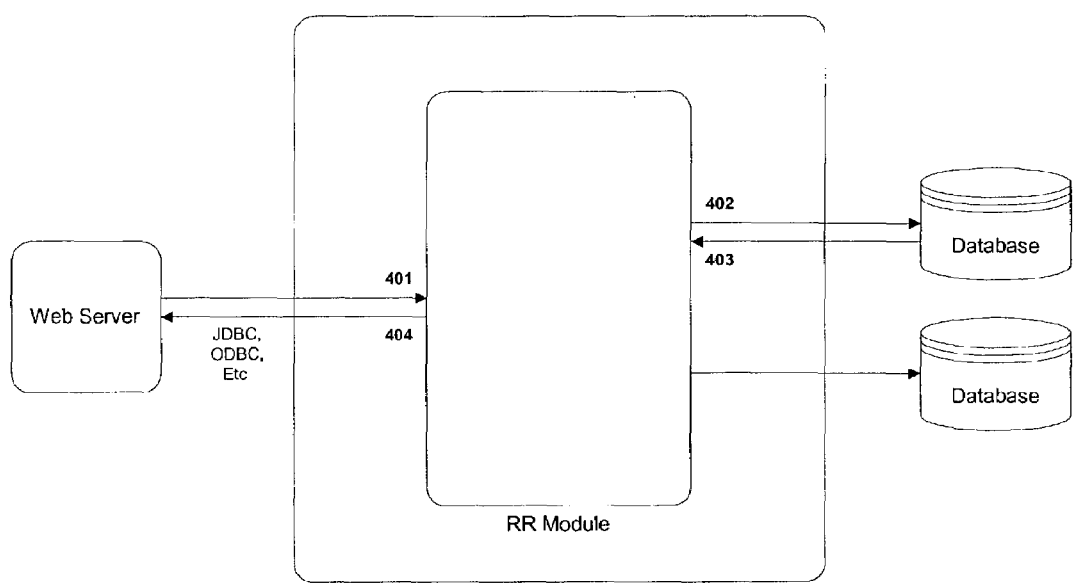
FIG. 4 shows an example block diagram of an embodiment of the data flow in the remote replication system in response to a read query.
Figure 5:
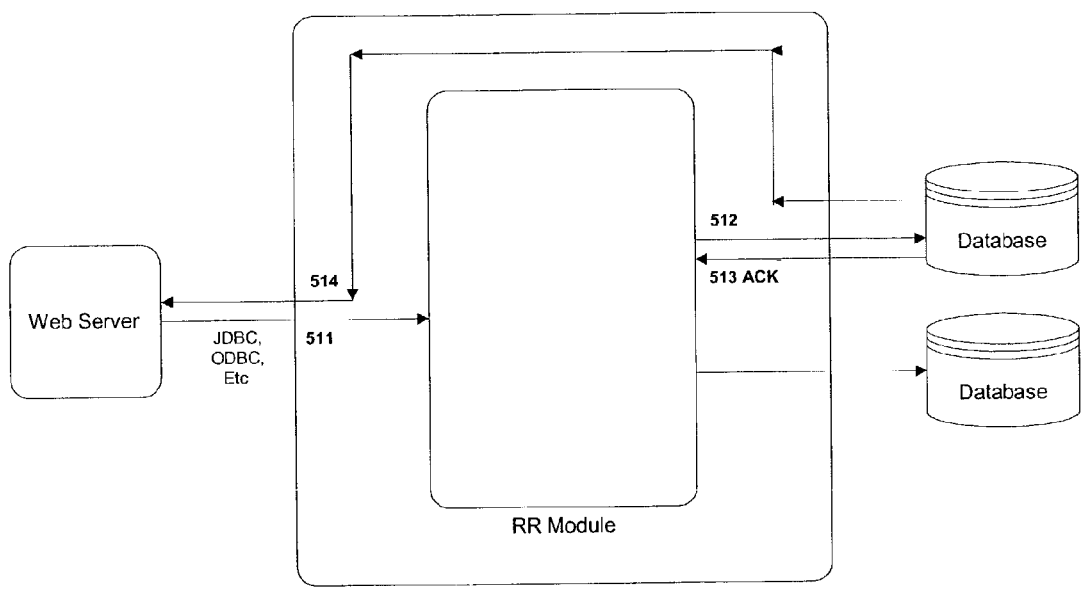
FIG. 5 shows another example block diagram of an embodiment of the data flow in the remote replication system in response to a read query.

FIGS. 4, 5, 6, and 7 show example diagrams of database remote replication scheme for preserving the unified view of data between two database servers. The methods are equally applicable to three or more nodes. In FIGS. 4-7, the RR module 32 performs a query check for the arrived SQL query to distinguish between read and update queries. FIGS. 4 and 5 show two alternative flows of messages and data if the SQL query is a read query. FIG. 4 illustrates the case of receiving a read query. The SQL query is sent from the web server to the RR module 32 using the data path 401. The RR module chooses one of the database nodes 24 to handle the query according to another scheme such as a load-balancing scheme. The RR module 32 then sends the SQL query to the selected database server 24, e.g., through the data path 402. The selected database server then processes the query and returns the result to RR module through the use of data path 403. At this stage, the RR module 32 proceeds with forwarding the result to the web server 18 through the data path 404. The only difference between FIG. 4 and FIG. 5 is that in the latter figure once a database server 24 is selected and the SQL query is passed to it through the data path 512, the selected database server sends the query result to the web server 18 directly, e.g., through the data path 514 after notifying the RR module 32 through the acknowledgement path 513.

Figure 6:
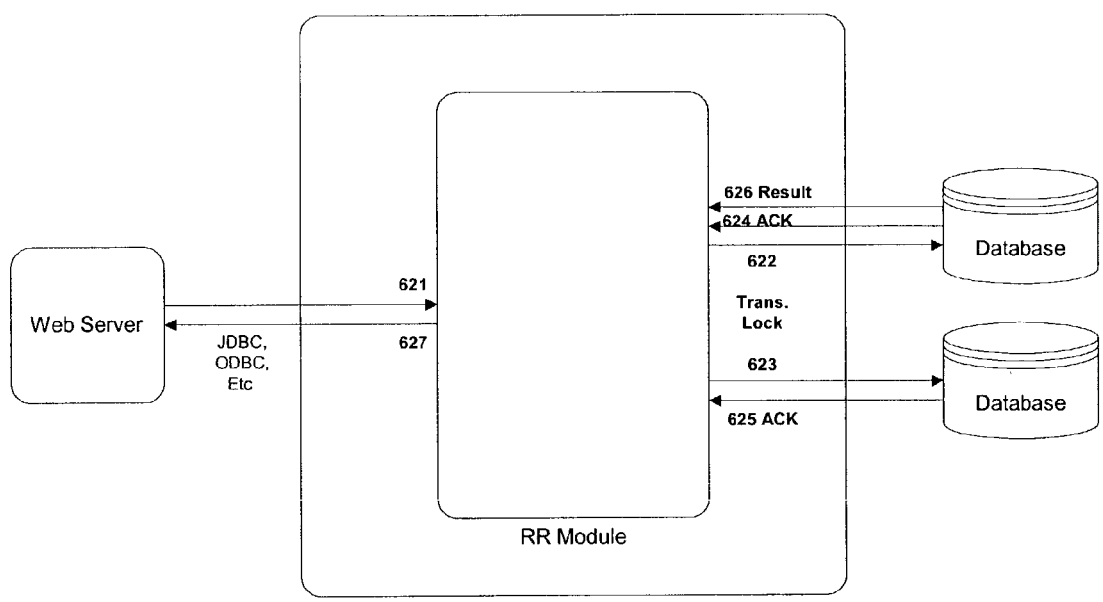
FIG. 6 shows an example block diagram of an embodiment of the data flow in the remote replication system in response to a write query.
Figure 7:
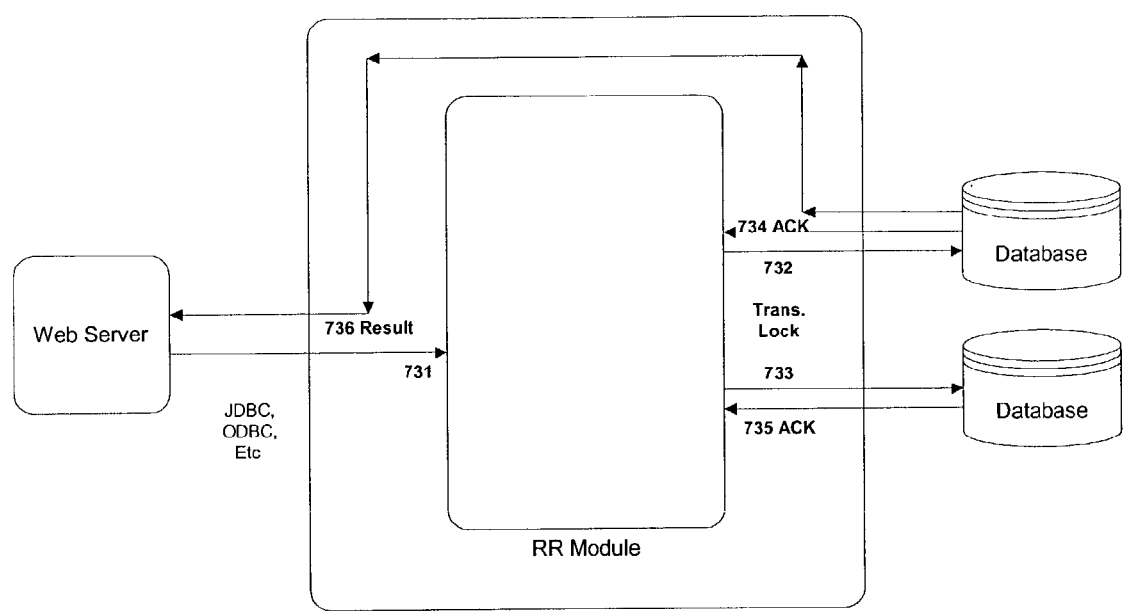
FIG. 7 shows another example block diagram of an embodiment of the data flow in the remote replication system in response to a write query.

FIGS. 6 and 7 show two alternative flows of messages and data if the RR module 32 query check detects an update query. FIG. 6 illustrates the case of receiving an update query. The SQL query is sent from the web server 18 to the RR module 32 using the data path 621. The RR module immediately performs a check to see whether the portion of data requested by the current query is not being updated by another query and is hence available. If the data is locked as the result of being accessed by another SQL query or is not available because of any other reason the operation has to wait. In this case, the RR module 32 checks the availability of data few more times before aborting the SQL query and returning an error message to the web server 18. If the data is available, the RR module places transaction locks 622 and 623 on both database servers 24 preventing any other query from accessing the portion of data requested by the current query. The RR module 32 chooses one of the database servers to handle the query according to a scheme such as a load-balancing scheme. The RR module then sends the SQL query to the selected database server 24, e.g., through the data path available on transaction lock 622. The selected database server 24 then processes the query and returns the result to RR module through the use of data path 626. To preserve the unified view of data among database servers 24, the RR module 32 sends the same SQL query to the other database server 24 through transaction lock data path 623. To assure the update query has been properly inserted in both database servers, the RR module 32 has to receive the acknowledgement messages from both database servers 24 through the paths 624 and 625 in a certain period of time. If both acknowledgement messages arrive within the specified period of time, the RR module 32 proceeds with forwarding the result to the web server 18 through the data path 627. Otherwise, the RR module rolls back the query using transaction locks 622 and 623 preserving the consistency of the unified view of data among database server nodes prior to receiving the current query. Deploying the time out mechanism also has the advantage of avoiding deadlocks in which the system comes to a grinding halt state as the result of each of the said database servers waiting for an event that only another database server can cause. The only difference between FIG. 6 and FIG. 7 is that in the latter figure once a database server is selected and the SQL query is passed to it through the data paths 732 and 733, the selected database server sends the query result to the web server 18 directly through the data path 736 as soon as the RR module removes the transaction locks 732 and 733.

Figure 8:
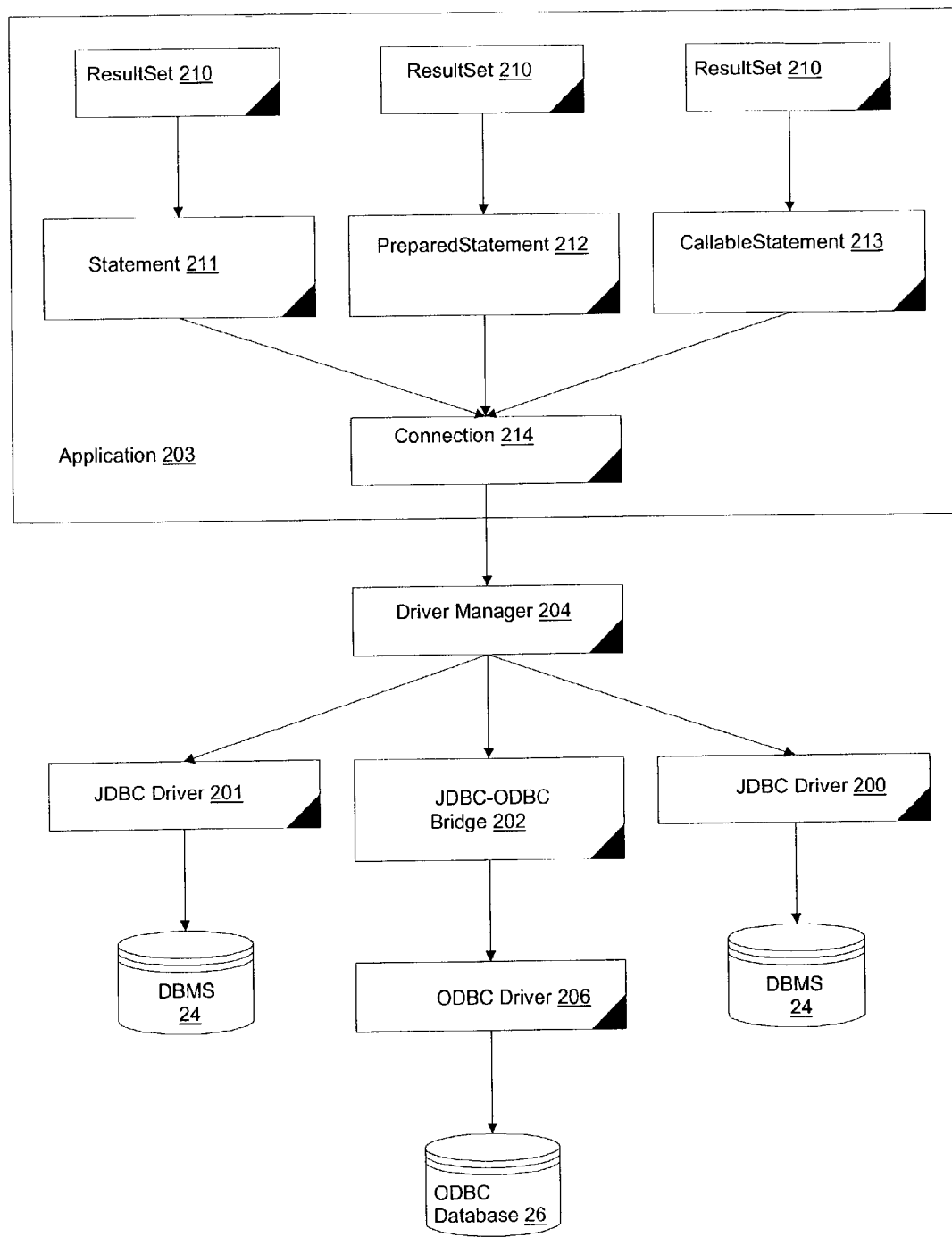
FIG. 8 shows example flowchart of an embodiment of a database connectivity model/architecture for connecting a database remote replication module according to the present invention.

The functional/data flow diagram in FIG. 8 shows example Java database connectivity for a version of remote replication model responding to a JDBC connection, functionally illustrating an enlarged data path in FIG. 3 from one of the web server 18 modules to one of RR modules 32 through the data paths VI or VII, respectively, in FIG. 3. Though JDBC is utilized for this example, other database connectivity interface models can equally be utilized. As described, JDBC is an SQL-level API that allows execution of SQL queries and retrieval of results, if any. The API is an abstraction of interfaces designed to perform actions against any database relying on dynamic run-time database access methods.

FIG. 8 displays part of interaction of client queries via a web server 18 directed by the RR module 32 to a selected database server 24. As such FIG. 8 shows a connectivity dataflow model that illustrates how a web server module 18 transparently interacts with a selected database server 24 while assuming the connection has been established with the RR module 32. The model is illustrated following the interaction between the RR module 32 and a database server 24 described earlier. A set of initial steps in the connectivity model include loading drivers, and establishing connections 214 to the database servers 24. JBDC driver categories can include:

1. JDBC-ODBC drivers 202, 206 which use bridge technology to connect a Java client to an ODBC database server 24. In this example, the Java client can comprise one of the middle-tier web servers 18 that sends a query to the database. Such drivers are implemented using native code, and are generally most appropriate when automatic installation and downloading of a Java technology application is not important;
2. Native-API partly Java technology-enabled drivers which convert JDBC calls into calls on the client API for e.g. PostgreSQL, Oracle, Sybase, Informix, DB2, or other DBMS. These drivers, as in the bridge drivers, require that some binary code be loaded on each client machine;
3. Net-protocol fully Java technology-enabled drivers which translate JDBC API calls into DBMS-independent net protocols that are then translated to DBMS protocols by servers. These net servers can connect all of their Java technology-based clients to many different databases. The specific protocol used depends on the vendor. In general, these are the most flexible JDBC API alternatives.

4. Native-protocol fully Java technology-enabled drivers which convert JDBC technology calls into the network protocol used by DBMSs directly. This allows a direct call from the client to the database server and is a practical solution for Intranet access.

As described, Java comprises a software package that relies on Java Virtual Machine (JVM) as the compiler. A JVM running on a pair of hardware and software platforms creates byte code from Java source code that can be interpreted at the run time by any other JVM running on any other pair of hardware and software platforms (e.g., FIG. 1B). Ports of JVM exist for different operating systems running on different hardware platforms. Examples are Solaris O.S. on Sparc Sun Microsystems hardware platform or Linux O.S. on Pentium Intel hardware platform. There are three types of Java programs: stand-alone programs known as applications, programs that run inside client web browsers known as applets, and programs that run inside a server known as servlets. While the RR module 32 according to the present invention takes advantage of stand alone Java applications for core functionality, the GUI management utility takes advantage of Java servlets to remotely manage the RR module 32 from the client browsers 34.

The components in FIG. 8 within dashed lines labeled as Application 203, are located in the web server 18, and the driver manager 204 and the drivers 200, 201 and 202 (e.g., Oracle driver, ODBC-JDBC bridge driver, MySQL driver) are available with standard Java distribution. The driver manager 204 includes a utility for loading the drivers 200, 201, 202, into the JVM. The JVM is not shown in FIG. 8 but it works within the context of Java application (i.e., there are three types of Java applications: stand alone, applet, and servlet) and acts to convert the Java code to byte code as described herein. Further, while establishing connections to the database serves 24, the driver manager 204 determines if each registered driver 200, 201, 202, recognizes an arrived URL. The URL refers to database connectivity URL within the context of Java.

The driver manager 202 then uses one of the drivers 200, 201, 202 that recognizes the URL to create a connection with a database server 24. A JDBC URL identifies an individual database server 24 in a driver-specific manner. A general format of a JDBC URL includes "jdbc:sunprotocol:subname", an example for ODBC-JDBC bridge driver includes "jdbc:odbc:somedb", The URL specifies JDBC, ODBC and the name of database and is usually accompanied by the user name and password for database access. Thereafter, steps specified in queries/requests, including reading data from database or writing data into database, can be performed.

The flowchart in FIG. 8 further shows the interaction between the Java application 203 (e.g., stand alone, applet, servlet, etc.), the JDBC driver (e.g., drivers 200, 201, 202), and the DBMSs 24. Each database management system 24 (e.g., Oracle, Sybase, PostgreSQL, MS-SQL, MySQL, mSQL, etc.) is accessed via a specific JDBC driver 200, 201 provided (e.g., JavaSoft for Open DataBase Connectivity (ODBC) supported databases, webLogic for Oracle, Sybase., MS-SQL, Symantec for Oracle, Sybase, MS-SQL, MS-Access, SAS for SAS, Oracle, Informix, Ingres, etc.).

In the example of FIG. 8, the database server 24 first loads a JDBC driver 200 into its own Java Virtual Machine (JVM). The JDBC driver 200 is hence used for opening/establishing a connection with a database server 24. The GUI, described above, can be utilized to choose the database type used in a specific multi-tier system 10. Thereafter, the Driver Manager 204 opens a connection to a specific database server 24 wherein the database server 24 is specified by a specially formatted Universal Resource Locator (URL). The Driver Manager 204 and all other modules in FIG. 8 are interface classes of JDBC API, wherein the interface is a general behavior description for a class (object orientation). A class implements an interface according to its own pattern to behave a desired way.

In the RR module 32, optimized query processing methods, instance pooling and connection pooling are utilized, as described. The pooling mechanisms keep a number of connections to each database server 24 and re-use them when necessary. This reduces the overhead of connection establishment and connection destruction greatly. The connections are created once and destroyed once.

Once the connection 214 is established, the Statement Block JDBC interface 211, or one of its more sophisticated versions (e.g., PreparedStatement 212 or CallableStatement 213) in the database server 24, execute SQL queries. PreparedStatement 212 extends the ability of Statement block 211 to bind input parameters to an SQL call just before execution. CallableStatement 213 relies on pre-compiled stored procedures that run faster than standard SQL queries and can also be used to return output parameters. The ResultSet block interface 210 is a representation format for the returned result of the query, and includes the result metadata including the number of rows, columns, search options, the maximum number of characters per column, etc. In one embodiment, the result of the query from the database server 24 is sent to the RR module 32 to pass on to the requesting web server 10 onto the client requester 14.

In the example embodiment herein, the web servers 10 support Java servlets. An example of such web servers is the Apache server with optional Tomcat servlet container running on Linux operating system. The choice of the Apache web server is optional and the present invention can work with any server. The web server 18, then, sends a SQL query to the RR module, wherein the RR module appears as a database server to the web server 18 (i.e., details of the RR module functionality are hidden from the web server). The RR module used proprietary transparent Java-based database connectivity interface to communicate with a selected database server and request services per the SQL query. Though in this example web servers 18 support Java servlets, that is not required. As long as the web server 18 sends an SQL query, the RR module 32 can interact with the web server 18.

In one aspect, the present invention is directed to a remote replication of multiple servers, independent of database engine implementation. A database remote replication model according to the present invention creates and preserves a unified view of data among the database servers for as long as the database servers running on different servers supports database transactions and/or atomic operations. Using functionality such as provided by Java technology in RR module 32, a single tool for connecting to most of database engines is provided. The range of databases includes e.g. commercial database engines such as Oracle, Informix, Sybase, MS-SQL as well as freeware engines such as PostgreSQL, and MySQL.

Conventional dependence of a multi-tier system on a specific database vendor prevents database remote replication to be applied to any other identical multi-tier system that replaces the back-end database tier with a different vendor component. An advantage of the present invention is that the RR module 32 can be equally applied to any database engine supporting functionality such as provided by e.g. database transactions and/or atomic operations. The remote replication scheme creates and preserves a unified view of data among a number of database servers. In one embodiment, the remote replication module 32 uses Java to provide transparent dynamic database content in a path that traverses the database server 24, the database remote replication module 32, the Java-enabled web server 10, and the Java-enabled client 14.

A remote replication module/method according to the present invention can be implemented in various embodiments, including for example: software embodiment, hardware embodiment, clustering embodiment, and turnkey embodiment (i.e. hardware/software also known as "thin server network appliance"), as described below.

An example software embodiment comprises remote replication software implementing the remote replication module/method of the present invention, installed directly onto e.g. server 44 in FIG. 1B (e.g., including computer system, operating system, database software, etc.) or database server array. Important consideration for software-only embodiments includes hardware and operating system (OS) dependency. Software is installed and upgraded on each server in the network, and driver IP addresses are provided directly to the users.

An example hardware embodiment comprises a mechanism to perform remote replication in a 7-layer OSI model. The OSI model includes, from the bottom to the top, physical, datalink, network, transport, session, data representation, and application layers. The physical connection is in the layer 1 physical layer whereas the logical connection is in the application layer 7. The layer 2 is the datalink layer and the layer 3 is the network layer. A central processor that executes background tasks such as routing, table and network management manages the switching.

An example clustering embodiment provides high scalability, high performance, and high cost characteristics. Clustering embodiment comprises processing on multiple servers and other host environments. A cluster model relies on multiple physical servers to act as one logical server. There are different clustering models. One model uses a peer-to-peer model in which each server keeps its own identity while having access to resources available in all other members of a cluster group (e.g., NCR life keeper). Another clustering model keeps the identity and the resources of each server of the cluster group separate, wherein a monitoring feature between the servers ensured that the resources of any failed server are transferred and managed by the other functioning servers of the group. Most of the models keep the failover operation transparent from the user point of view.

Figure 9:
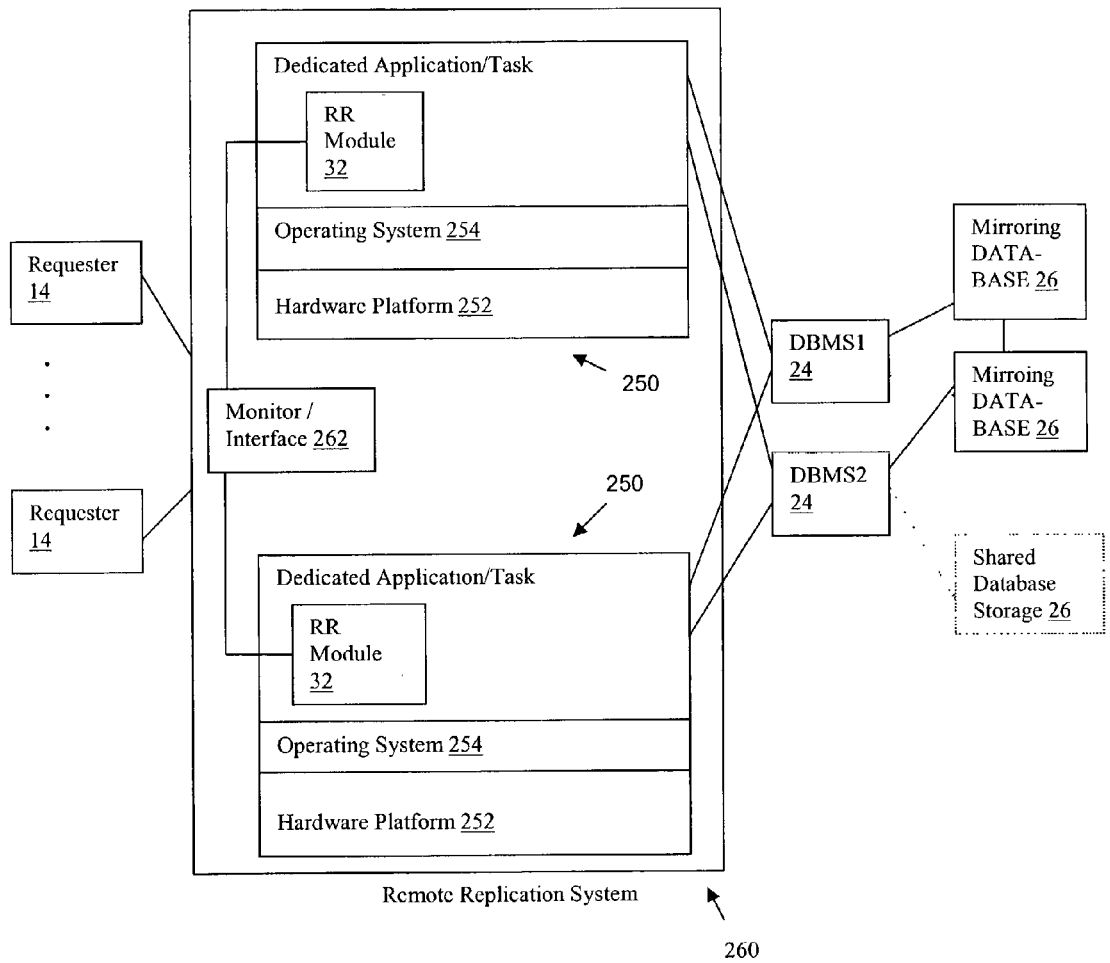
FIG. 9 shows an example block diagram of an embodiment of the functional architecture of a thin server application remote replication system according to an aspect of the present invention.

Referring to FIG. 9, an example of turnkey embodiment of a remote replication system according to the present invention comprises "thin server network appliance" software/hardware module that enhance traffic performance. A thin server 250 appliance comprises a computer system configured to perform dedicated tasks efficiently. The computer system can include a hardware platform 252 and operating system 254 similar to those described in conjunction with server 44 in FIG. 1B. The resources of the thin server appliance 250 are only used towards accomplishing the dedicated tasks. An example of such a task includes one or more said RR modules 32. Preferably, the thin server appliance 250 has relatively lower overhead of management within a specific application context compared to a general-purpose server/system. Turnkey remote replication systems manage a specific server/application, are plug-and-play and maintain an open and flexible architecture to grow over time.

As shown in FIG. 9, in one embodiment, in another aspect the present invention provides a remote replication system 260 including two redundant integrated RR modules 32 between the database servers 24 and the clients 14, operating jointly as parallel and hot-spare remote replication servers. The RR modules 32 are shown as thin server appliances 250. A monitor/interface (e.g., heartbeat interface) component 262 provides routing of the incoming requests to one of the two RR modules 32 that is functioning. Further, each remote replication module can include the combination of remote replication schemes and a heartbeat interface therein. In one version, the RR module comprises a software component while the heartbeat interface comprises a network interface that performs pinging. The heartbeat interface can be a component of the thin server appliance and is suitable for two thin server appliances that act in an active-passive or active-active model. This redundancy offers fail-safe, cost-effective operation and significantly minimizes maintenance. Database servers 24 can be upgraded and managed without any downtime or affect on the operation of the network (e.g., multi-tier system).

Because many businesses use various database engines, the remote replication methods according to the present invention are advantageous for such businesses. Further, the present invention can be implemented with any database model capable of supporting transactions. As such, the present invention is not dependent on any particular database.

The present invention is further advantageous for mid range businesses that have not predicted purchasing expensive enterprise edition database models while still in need of a strongly scalable and highly available method. The present invention provides cost effectiveness for the overall multi-tier computer system as well as end-user satisfaction. The present invention further enables building a complete low cost back-end tier relying on freeware database engines (e.g. PostgreSQL) or other database engines of choice.

As such, the present invention can be implemented as a low cost turnkey system, with e.g. standard Intel hardware platforms and freeware Linux/J2SDK software platforms, as a database remote replication layer for a number of database engines. The present invention in a turnkey server appliance embodiment (thin appliance) acts as an independent extra layer in a multi-tier environment, leading to reduced database management overhead.

The present invention further provides high availability for a multi-tier computer system by managing database remote replication task independent of the database engines (database servers). Hence, problems with database engines are isolated from the operation of the multi-tier system that otherwise can block the operation of the system if relying on a single database server. In the latter case, if the database server malfunctions, no alternative for obtaining the requested data is available. Using multiple database servers, the RR module avoids sending requests to the malfunctioning database server. In one version, the RR module checks the status of all database servers it manages ongoingly through the use of ping command. Further, by implementing the active-passive or active-active dual database remote replication modules, the present invention does not introduce a single point of failure.

Referring to FIG. 9, the RR module 32 handles the interface to multiple front-end database components on one side through the use of TCP/IP connections with a well-known port number and IP address to multiple back-end database components through the use of TCP/IP connections with well-known port numbers and addresses on the other side. Each of the back-end components implements identical databases, with the idea of improving performance and throughput from a replicated database model that looks to the applications like a single database.

The RR module 32 process is initiated with a front-end port number and a list of back-end port numbers and addresses identifying the database servers. The process accepts connection requests from the web servers 18 and maps them into back-end database servers 24 connections, satisfying connection requests for the same User/Database from a pool of open connections to back-end database servers 24 components. Relying on the said approach, the RR module 32 process minimizes connect and disconnect overhead. The RR module 32 process interfaces to another software component such as a load-balancing component for selecting the appropriate back-end database server for each arrived query request. The RR module design uses the published database front-end and back-end interfaces on both sides to simplify implementation, minimize overhead and reduce translation errors.

The RR module 32 process starts a thread to interface to each front-end web server 18 connection. Each thread is spawned/created to perform a special task (e.g., to perform a remote replication scheme, provide response to a special client request, communicate with a database server, etc.) and ends when the task is performed. The process that spawns off threads remains executing for as long as the thin server appliance 250 and RR module 32 server appliance in FIG. 9 remain up and running.

The RR module 32 process receives a startup message containing the user name and database name. The process handles authentication for any new user/database through one of the back-end database servers 24 and remembers authentication information to be able to handle subsequent authentication sequences with the front-end web server 18. The RR module 32 process independently handles authentication sequences with back-end database servers 24 as required. In one embodiment, each query request or function request is handled independently by a back-end database server 24 to be selected by the another software component such as said load-balancing component. The RR module 32 process evaluates the query text to recognize updates and transactions for special handling. In general, the sequence is to read a message from the front-end web server 18 and pass it to the back-end database server 24 or read a message from the back-end database server 24 and pass it to the middle tier web server 18. In the latter case, the RR module 32 may only intercept the received message from the back-end database server 24. The RR module 32 process keeps track of the kinds of messages transmitted in order to know whether its next message is to be received from the middle tier web server 18 or the back-end database server 24.

Figure 10:
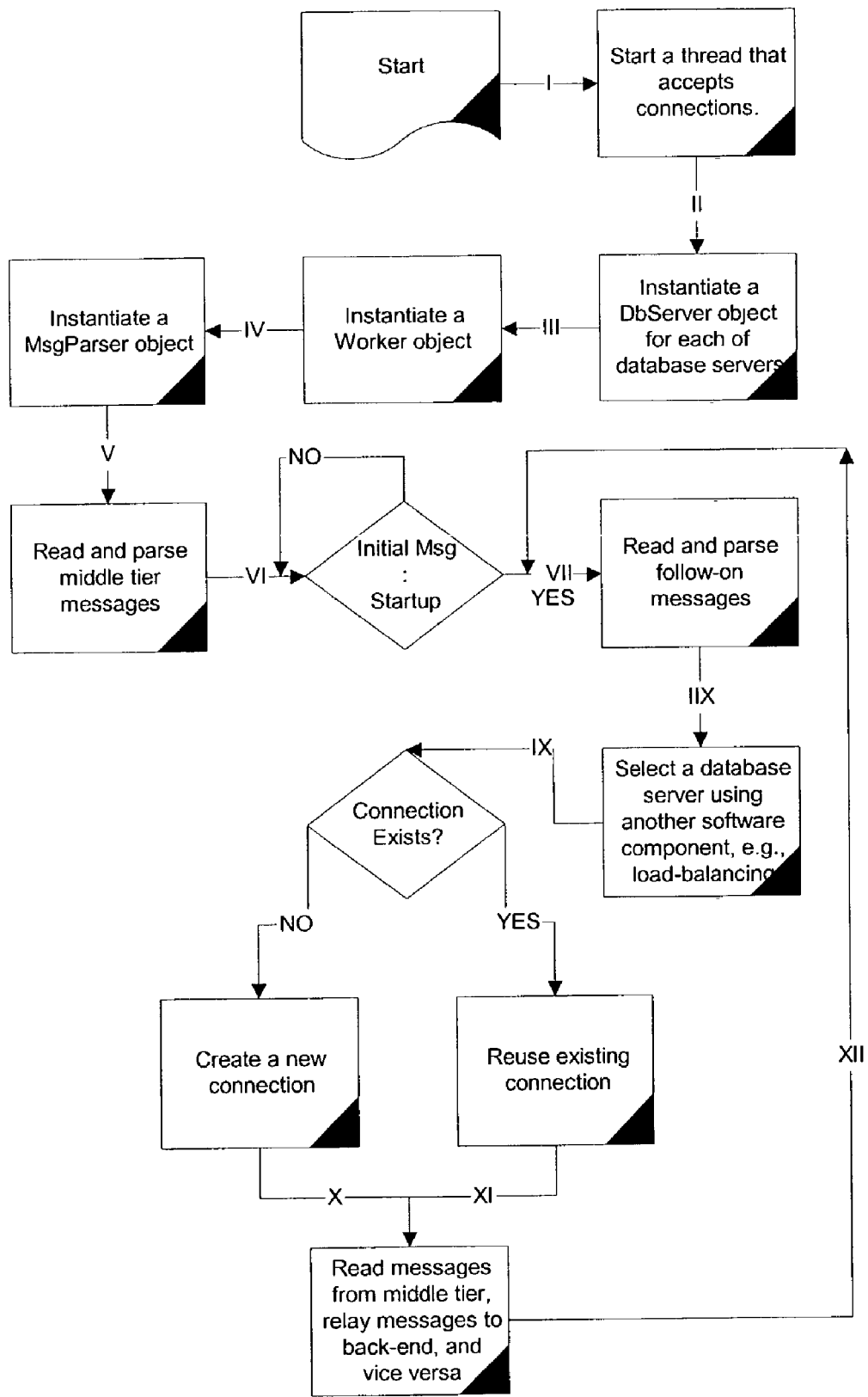
FIG. 10 shows an example flowchart of the process within the remote replication module in FIG. 1A.

FIG. 10 shows an example flowchart of an embodiment of remote replication process. Referring to FIG. 10, the process main routine starts a thread to accept. The RR module process also handles each middle tier web server connection. The process instantiates a DbServer object for each back-end database server port number and address provided on the list of program parameters. The process also instantiates a Worker object that handles the operation logic. A msg-Parser object is then instantiated to handle parsing messages between the middle tier web servers and the back-end database servers. The process reads and parses messages from the middle tier servers, reads the initial message that is expected to be a "Startup" message, selects the database to handle the arrived query through the use of another software components such as a load-balancing component, and either reuses or creates a connection to read and parse messages from the back-end database servers. Once the connection between the middle tier web servers and selected back-end database server is transparently established, the process operates by reading messages from the middle tier web servers and relaying them to the selected back-end database server or vice versa. The RR module process maintains state by snooping on the messages and using that state to determine whether the next message is to be received from the middle tier web server or the back-end database server 24.

Synchronized Recovery

The recovery mechanism is used before bringing a new or repaired database server online. It synchronizes the new/repaired database server view of data with the view of data of the other database servers. The mechanism is implemented taking advantage of standard checkpoint feature available in most database systems. A checkpoint is a point in time static image of the database system that includes complete information about the status of database data content. The capabilities required are as follow:

1. If a back-end database server fails with a hardware error or fatal software error or is taken offline for any reason, the back-end tier system consisting of the RR module 32 and the rest of database servers 24 should be able to remain functional without requiring to take other units off line.
2. If a failed back-end database server is repaired, the back-end tier system consisting of the RR module 32 and database servers 24 should be able to restore the database server to online status by applying updates from the database servers most recent checkpoints and the recovery log of RR module 32 without taking the other units off line.
3. The back-end tier system consisting of the RR module 32 and database servers 24 should be able to create and initialize a new back-end database server, and then bring the back-end database server online without a complete disruption of service.

To accomplish these requirements, the remote replication module 32 takes control of the when checkpoints are created. In addition, the RR module 32 maintains its own recovery log. By wrapping the command in a transaction and applying the same synchronization techniques used for preserving the unified view of data among live database servers 24, it assures that a consistent, synchronized point in time static database image has been stored on all online back-end database servers after successful creation of a checkpoint.

The RR module 32 maintains a recovery log by writing each update request to its local disk. In one embodiment, each update is also sent to the passive RR module which writes its own copy of the recovery log to prevent the recovery log from becoming a single point of failure. The RR module 32 takes care in insuring that disk writes are actually written to the disk and are not cached in memory instead. Although the RR module logging approach is somewhat redundant with the log maintained by each back-end database server, it is nonetheless necessary. The log maintained by each unit contains the complete set of updated records after a checkpoint. The full update log of each unit is unique to that unit and is not used on any other database server since the same rows are not necessarily saved in the same order for different database servers.

Figure 11:
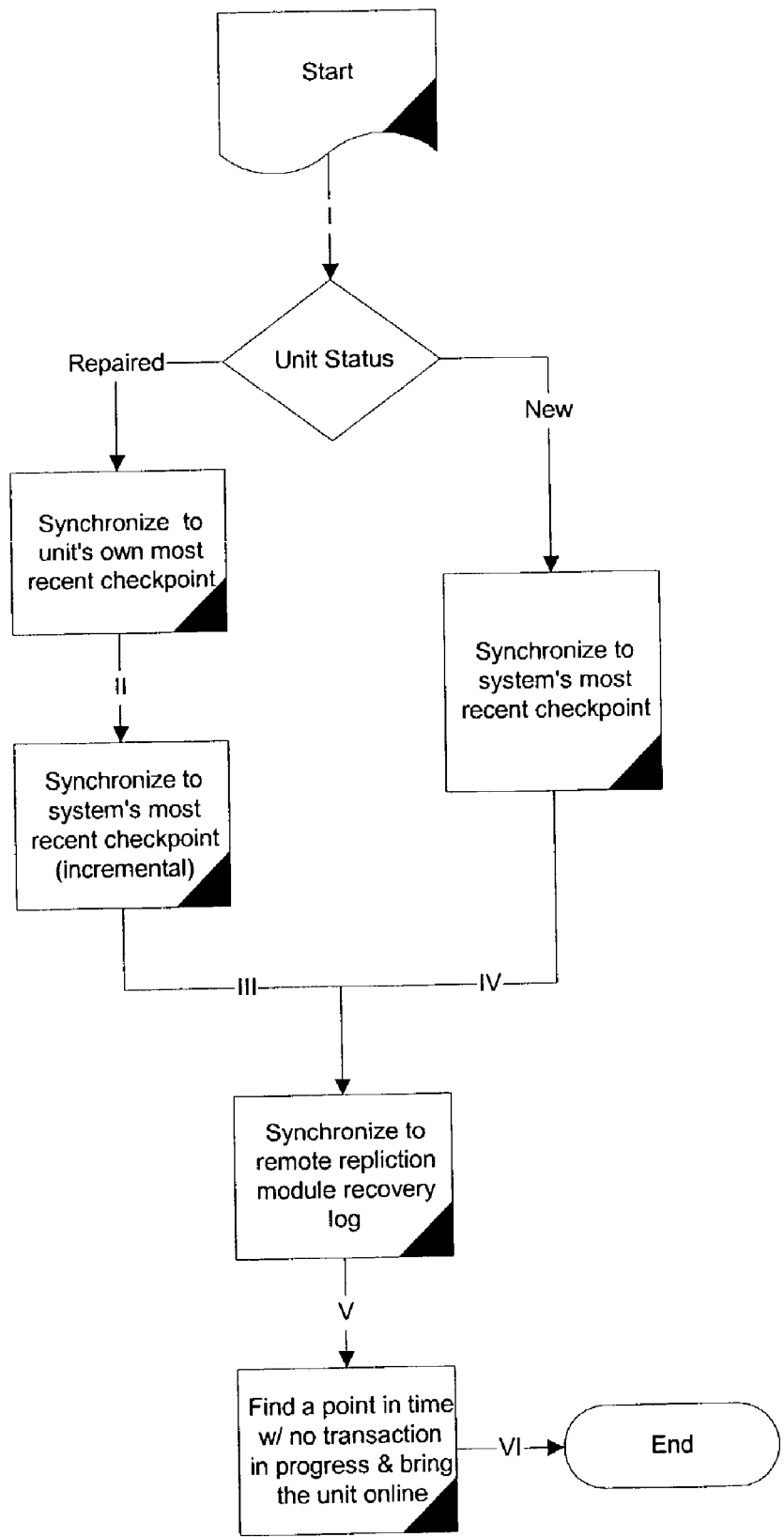
FIG. 11 shows an example flowchart of the recovery process within the remote replication module in FIG. 1A.

FIG. 11 shows an example embodiment flowchart of the recovery process. The recovery process for a single back-end database server is as follows:

1. Recover the database server to the most recent synchronized checkpoint of the system.
2. Apply all remote replication module update entries after the checkpoint to the database server.
3. Find a point in time containing no transactions in progress and bring the database server online.

Recovering the database server to the most recent synchronized checkpoint requires a utility to run on the back-end database server. The utility scans the recovery log on the back-end database server for the appropriate checkpoint. Once found, it will go forward from that point looking for the first update of each record. These updates contain the state of each record and will be written to disk. When the log has been fully processed, the database server will have been recovered to the state of the checkpoint.

Applying the RR module 32 recovery log entries is straight forward and is done from the RR module. Finding a point when there are no transactions in progress will require a decision on the part of the system administrator. In one embodiment, the administrator can choose to simply wait for that moment to occur naturally, disable any new transactions and wait for existing transactions to complete or terminate all transactions. Combinations are also possible. In another embodiment, for example, the system administrator may wait for a sync point to occur naturally and if it does not occur in a certain period of time, disable any new transactions. If a sync point still does not occur in another period of time following the first period, disable all transactions in progress.

At the time of initializing a new back-end database server, an online database server is selected and a checkpoint of the selected server is taken. The database content of the selected back-end database server is then replicated onto the new database server. The RR module 32 can then proceed with performing the second and third steps of the normal recovery process on the new unit described above and illustrated in FIG. 11.

The system administration graphical user interface (GUI) utility dynamically displays the status indicating what database servers are live, which database servers are in recovery and for those in recovery, how many recovery records remain and the approximate time until the each of those servers are brought online.

Figure 12:
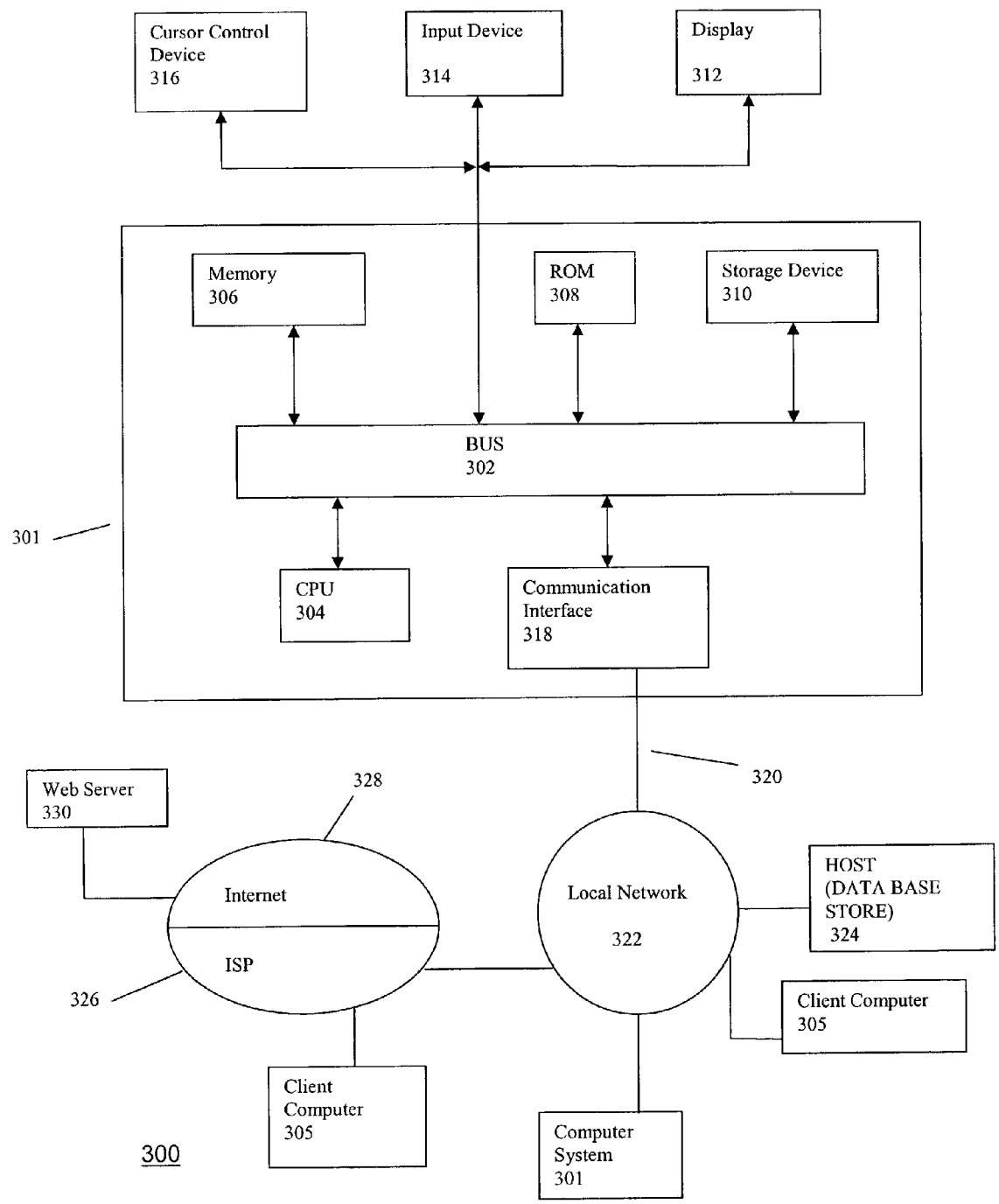
FIG. 12 shows a block diagram of an example architecture of an embodiment of another computer system in which the present invention can be implemented.

FIG. 12 shows a block diagram of an example architecture of an embodiment of a computer system 300 in which the present invention can be implemented. The computer system 300 includes one or more computer systems 301, wherein an RR module according to the present invention can be implemented in one or more of the computer systems 301. A computer system 301 (e.g., back-end tier server) includes a bus 302 or other communication mechanism for communicating information, and a processor 304 coupled with the bus 302 for processing information. The computer system 301 also includes a main memory 306, such as a random access memory (RAM) or other dynamic storage device, coupled to the bus 302. A portion of the memory 306 is used for storing information and instructions to be executed by the processor 304, and another portion of the memory 306 is used for storing temporary variables or other intermediate information during execution or instructions to be executed by the processor 304.

The computer system 301 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions. The bus 302 may contain, for example, thirty-two address lines for addressing the main memory 306 or video memory. The bus 302 can also include, for example, a 32-bit or a 64-bit data bus for transferring data between and among the components, such as the CPU 304, the main memory 306 and the storage 310. Alternatively, multiplex data/address lines may be used instead of separate data and address lines.

In one embodiment, the CPU 304 comprises a microprocessor manufactured by Motorola(R) such as 680×0 processor, or a microprocessor manufactured by Intel(R), such as the 80×86, or Pentium(R) processor, or a SPARC(R) microprocessor from Sun Microsystems(R). However, any other suitable microprocessor or microcomputer may be utilized, based on the processing requirements for the computer system 301. The main memory 306 can comprise dynamic random access memory (DRAM). And video memory (not shown) can comprise a dual-ported video random access memory.

The computer system 301 can be coupled via the bus 302 to a display 312, such as a cathode ray tube (CRT), for displaying information to a computer user. An input device 314, including alphanumeric and other keys, is coupled to the bus 302 for communicating information and command selections to the processor 304. Another type or user input device comprises cursor control 316, such as a mousse, a trackball, or cursor direction keys for communicating direction information and command selections to the processor 304 and for controlling cursor movement on the display 312. This input device typically has two degrees of freedom in two axes, a first axis (e.g., x) and a second axis (e.g., y) that allows the device to specify positions in a plane.

A thin server appliance is usually accessed by a web browser remotely for the task of administration. The standard PC input/output devices such as monitor and keyboard are only used for maintenance and support by the manufacturer and not the end user.

According to one embodiment of the invention, the steps of the RR module described above, is performed by a computer system 301 in response to the processor 304 executing one or more sequences of one or more instructions contained in the main memory 306. Such instructions may be read into the main memory 306 from another computer-readable medium, such as the storage device 310 or floppy disks.

Execution of the sequences of instructions contained in the main memory 306 causes the processor 304 to perform the RR module steps described herein. One or more processors in a multi-processing arrangement may also be employed to execute the sequences of instructions contained in the main memory 306. In alternative embodiments, hard-wired circuitry may be used in place of or in combination with software instructions to implement the invention. Thus, embodiments of the invention are not limited to any specific combination of hardware circuitry and software.

The methods of the present invention (e.g., RR module) can be implemented as computer instructions on a computer-readable-medium. The term "computer-readable medium" as used herein refers to any medium that participated in providing instructions to the processor 304 for execution. Such a medium may take many forms, including but not limited to, non-volatile media, and volatile media. Non-volatile media includes, for example, optical or magnetic disks, such as the storage device 310. Volatile media includes dynamic memory, such as the main memory 306.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the computer system 301 can receive the data on the telephone line and use an infrared transmitter to convert the data to an infrared signal. Although in general a modem can be used, a business can rely on a type of T1 LAN for communication. Also the web server 330 may or may not be co-located with database and remote replication servers on business site.

An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

The computer system 301 also includes a communication interface 318 coupled to bus the 302. The communication interface 318 provides a two-way data communication coupling to a network link 320 that is connected to a local network 322. For example, the communication interface 318 may be an integrated services digital network (ISDN) card or a modem to provide a data communication connection to a corresponding type of telephone line, which can comprise part of the network link 320.

As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information. Further, the communication interface 318 can comprise a USB/Tuner and the network link 320 may be an antenna or cable for connecting the computer system 301 to a cable provider, satellite provider for receiving messages, data and program code from another source.

The network link 320 typically provides data communication through one or more networks to other data devices. For example, the network link 320 may provide a connection through the local network 322 to a host computer 324, to one or more client computers 305, or to data equipment operated by an Internet Service Provider (ISP) 326. The ISP 326 in turn provides data communication services through the 'Internet' 328.

The local network 322 and the Internet 328 both use electrical, electromagnetic or optical signals that carry digital data streams. The signals through the various networks and the signals on the network link 320 and through the communication interface 318, which carry the digital data to and from the computer system 301, are exemplary forms or carrier waves transporting the information. The computer system 301 can send/receive messages/data, including program code, through the network link 320 and the communication interface 318. The received code may be executed by the processor 304 as it is received, and/or stored in the storage device 310, or other non-volatile storage for later execution. In this manner, the computer systems 301 can obtain application code in the form of a carrier wave.

The example versions of the invention described herein are implemented as logical operations in computing systems 301. The logical operations of the present invention can be implemented as a sequence of steps executing on the computing system 301, and as interconnected machine modules within the computing system 301. The implementation is a matter of choice and can depend on performance of the computer system 301 and/or network 300, implementing the invention. As such, the logical operations constituting said example versions of the invention are referred to for e.g. as operations, steps or modules.

The present invention has been described in considerable detail with reference to certain preferred versions thereof; however, other versions are possible. Therefore, the spirit and scope of the appended claims should not be limited to the description of the preferred versions contained herein.

What is claimed is:

1. A remote replication method for back-end tier of a multi-tier computer system comprising multiple database servers, wherein said replication method creates a unified view of data among all of said database servers in the back-end tier, and wherein said unified view provides a virtually centralized database server from a collection of physically distributed database servers by executing the following steps:
   (i) designating at least one of said database servers as the primary replication server;
   (ii) directly and constantly monitoring the health status of all of the existing database servers, detecting any non-functioning database server, and isolating said non-functioning database server from the rest of database servers;
   (iii) receiving one or more database query requests (queries) from database clients including database functions for operating on data stored in said database servers;
   (iv) distinguishing between read and update queries for said database query requests;
   (v) establishing connections between said database servers and the primary replication server;
   (vi) assigning each read query according to a load-balancing selection criterion to one of database servers for the purpose of communicating the read query results to the issuing database clients;
   (vii) conditionally assigning each update query to said database servers comprising the substeps of:
      a) placing transaction locks on the portion of data requested by the update query in all of said database servers,
      b) synchronizing the update query among said database servers,
      c) determining the synchronization status to release the transaction locks only when all of said database servers are synchronized with each other otherwise rolling back the changes from those database servers being updated, and
      d) communicating the update query results to the issuing database clients.

2. The method of claim 1 further synchronizes the view of data of a newly added database server with the unified view of data of existing database servers prior to allowing said newly added database server function with said existing database servers online through a synchronization procedure which introduces no interruption of service in the operation of the back-end tier of said multi-tier computer system and comprises steps of:
- (i) creating frequent synchronization checkpoints in said database servers;
- (ii) maintaining a transient recovery change log to capture intermediate update query requests in all periods of the synchronization procedure processing;
- (iii) synchronizing the newly added database server to the most recent synchronization checkpoint;
- (iv) repeatedly analyzing and applying the remote replication method change log entries after synchronizing the newly added database server with the most recent synchronization checkpoint of said database servers; and
- (v) finding a point in time containing no transaction in progress and bringing the newly added database server online.

3. The method of claim 1 wherein the logical step of establishing connections to said multiple database servers further comprises:
- (i) using Java Database Connectivity (JDBC), Open Database Connectivity (ODBC) or a comparable database connectivity interface utilizing TCP/IP protocols for known IP addresses and port numbers;
- (ii) maintaining said connections to said database servers; and
- (iii) reusing existing connections for communication with said database servers.

4. The method of claim 3 wherein the logical step of establishing connections further includes the substeps of:
- (i) establishing a first set of connections to a first subset of said multiple database servers using a first database connectivity interface; and
- (ii) establishing a second set of connections to a second subset of said multiple database servers using a second database connectivity interface.

5. The method of claim 4 further comprising the steps of, after processing of a query request by a database server, receiving response from the database server in relation to said query request via the selected database sever, and communicating the response directly to the database client requester.

6. The method of claim 4, wherein establishing said connections comprises object oriented technologies with the steps of utilizing either a single-threaded or a multi-threaded inter-process communication protocol.

7. A remote database replication system with a remote replication method for back-end tier of a multi-tier computer system comprising multiple database servers and multiple remote replication servers wherein said replication system creates a unified view of data among all of said database servers in the back-end tier, and wherein said unified view provides a virtually centralized database server from a collection of physically distributed database servers by supplying means for:
- (i) designating one of the database servers as the primary remote replication server;
- (ii) monitoring the health status of the primary remote replication server by a secondary remote replication server and changing the designation of the primary remote replication server to said secondary replication server based on detecting a non-functioning status for said primary server;
- (iii) receiving new database query requests from database clients including database functions for operating on data stored in said database servers;
- (iv) distinguishing between read and update queries for said database query requests;
- (v) establishing connections between said database servers and the primary replication server;
- (vi) assigning each read query according to a load-balancing selection criterion to one of database servers for the purpose of communicating the read query results to the issuing database clients; and
- (vii) conditionally assigning each update query to said database servers, placing transaction locks on the portion of data requested by the update query in all of said database servers, synchronizing the update query among said database servers, determining the synchronization status to release the transaction locks only when all of said database servers are synchronized with each other otherwise rolling back the changes from those database servers being updated, and communicating the update query results to the issuing database clients.

8. The remote replication system of claim 7 further includes means for synchronizing the view of data of a newly added database server with the unified view of data of existing database servers prior to allowing said newly added database server function with said existing database servers online through a synchronization procedure which introduces no interruption of service in the operation of the back-end tier of said multi-tier computer system and comprises steps of:
- (i) creating frequent synchronization checkpoints in said database servers;
- (ii) maintaining a transient recovery change log to capture intermediate update query requests in all periods of the synchronization procedure processing;
- (iii) synchronizing the newly added database server to the most recent synchronization checkpoint;
- (iv) repeatedly analyzing and applying the remote replication method change log entries after synchronizing the newly added database server with the most recent synchronization checkpoint of said database servers; and
- (v) finding a point in time containing no transaction in progress and bringing the newly added database server online.

9. The remote replication system of claim 7 wherein means for establishing connections to said multiple database servers further comprises:
- (i) utilizing Java Database Connectivity (JDBC), Open Database Connectivity (ODBC) or a comparable database connectivity interface utilizing TCP/IP protocols for known IP addresses and port numbers;
- (ii) maintaining said connections to said database servers; and
- (iii) reusing existing connections for communication with said database servers.

10. The remote replication system of claim 9 further comprises means for establishing connections which includes the substeps of:
- (i) establishing a first set of connections to a first subset of said multiple database servers using a first database connectivity interface; and
- (ii) establishing a second set of connections to a second subset of said multiple database servers using a second database connectivity interface.

11. The remote replication system of claim 10, wherein means for establishing said connections comprises object oriented technologies with the steps of utilizing either a single-threaded or a multi-threaded inter-process communication protocol.

12. The remote replication system of claim 7, wherein the multi-tier computer system includes multiple computers interconnected via a communication link means, at least one of said computers designated as a front-end tier computer generating said requests, at least two of said computers designated as a back-end tier computer, each back-end computer including a database server, and at least one of said computers designated as a middle tier computer for interfacing between the front-end and back-end tier computers.

13. The remote replication system of claim 12, wherein at least one of said multiple computers is designated as a remote replication server for interfacing between the middle tier and back-end tier computers.

14. The remote replication system of claim 12, wherein the set of single or multiple remote replication servers and multiple database servers further acts as a single database server to the middle tier servers and front-end computers.

15. The remote replication system of claim 12 further comprising means for, after processing of a query request by a database server, receiving response from the database server in relation to said query request via the selected database sever, and communicating the response indirectly to the requesting middle tier server via the remote replication server or directly to the requesting middle tier server.

16. A computer program product stored in a computer readable non-volatile and volatile storage medium for use with a database remote replication system in back-end tier of a multi-tier computer system comprising multiple database servers and multiple remote replication servers wherein said computer program creates a virtually centralized database server from a collection of physically distributed database servers and wherein said computer program comprises:
   (i) means for designating one of the remote replication servers as the primary replication server;
   (ii) means for monitoring the health status of all of the existing database servers directly by said primary replication server and isolating any non-functioning database server from the rest of database servers;
   (iii) means for monitoring the health status of the primary remote replication server directly by a secondary replication server and replacing it with said secondary replication server in case of failure;
   (iv) means for receiving one or more database query requests by the primary replication server requiring database functions for operating on data stored in said database servers;
   (v) means for distinguishing between read and update queries for said database query requests;
   (vi) means for utilizing either a single-threaded or a multi-threaded inter-process communication protocol connections from said primary remote replication server to said multiple database servers for communicating with said database servers;
   (vii) means for assigning each read query according to a load-balancing selection criterion to one of database servers for the purpose of communicating the read query results to the issuing database clients;
   (viii) means for conditionally assigning each update query to said database servers, placing transaction locks on the portion of data requested by the update query in all of said database servers, synchronizing the update query among said database servers, determining the synchronization status to release the transaction locks only when all of said database servers are synchronized with each other otherwise rolling back the changes from those database servers being updated, and communicating the update query results to the issuing database clients.

17. The computer program product of claim 16 further provides, means for synchronizing the view of data of a newly added database server with the unified view of data of existing database servers prior to allowing said newly added database server function with said existing database servers online through a synchronization procedure which introduces no interruption of service in the operation of the back-end tier of said multi-tier computer system and comprises steps of:
   (i) creating frequent synchronization checkpoints in said database servers;
   (ii) maintaining a transient recovery change log to capture intermediate update query requests in all periods of the synchronization procedure processing;
   (iii) synchronizing the newly added database server to the most recent synchronization checkpoint;
   (iv) repeatedly analyzing and applying the remote replication method change log entries after synchronizing the newly added database server with the most recent synchronization checkpoint of said database systems; and
   (v) finding a point in time containing no transaction in progress and bringing the newly added database server online.

18. The computer program product of claim 16 wherein means for the logical step of establishing connections to said multiple database servers further comprises:
   (i) using Java Database Connectivity (JDBC), Open Database Connectivity (ODBC) or a comparable database connectivity interface utilizing TCP/IP protocols for known IP addresses and port numbers;
   (ii) maintaining said connections to said database servers; and
   (iii) reusing existing connections for communication with said database servers.

19. The computer program product of claim 18 wherein the logical step of establishing connections further includes the substeps of:
   (i) establishing a first set of connections to a first subset of said multiple database servers using a first database connectivity interface; and
   (ii) establishing a second set of connections to a second subset of said multiple database servers using a second database connectivity interface.

20. The computer program product of claim 19 further comprising means for, after processing of query request by a database server, receiving response from the database server in relation to said query request via the selected database sever, and communicating the response indirectly to the requesting middle tier server via the remote replication server or directly to the requesting middle tier server.

* * * * *